United States Patent
Cui et al.

(10) Patent No.: US 12,412,564 B2
(45) Date of Patent: Sep. 9, 2025

(54) TEXT DATA PROCESSING METHOD AND APPARATUS

(71) Applicant: HUAWEI TECHNOLOGIES CO., LTD., Guangdong (CN)

(72) Inventors: Tong Cui, Shenzhen (CN); Jinghui Xiao, Xi'an (CN); Liangyou Li, Hong Kong (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 329 days.

(21) Appl. No.: 18/151,186

(22) Filed: Jan. 6, 2023

(65) Prior Publication Data

US 2023/0162723 A1    May 25, 2023

Related U.S. Application Data

(63) Continuation of application No. PCT/CN2021/104902, filed on Jul. 7, 2021.

(30) Foreign Application Priority Data

Jul. 10, 2020   (CN) .......................... 202010662105.9

(51) Int. Cl.
  *G06F 17/00*   (2019.01)
  *G06F 40/279*  (2020.01)
  (Continued)

(52) U.S. Cl.
  CPC .......... *G10L 15/063* (2013.01); *G06F 40/279* (2020.01); *G06F 40/30* (2020.01);
  (Continued)

(58) Field of Classification Search
  None
  See application file for complete search history.

(56) References Cited

U.S. PATENT DOCUMENTS 10,431,207 B2 * 10/2019 Angkititrakul ......... G10L 15/16
2007/0299664 A1 * 12/2007 Peters ..................... G06F 40/16
                                                    704/235

(Continued)

FOREIGN PATENT DOCUMENTS

| CN | 108073574 A | 5/2018 |
|---|---|---|
| CN | 108417205 A | 8/2018 |

(Continued)

OTHER PUBLICATIONS

Pruthi Danish et al "Realistic Noisy Text Generation for Fortified NLP", ICML, Jun. 9, 2019 (Jun. 9, 2019), XP093092955 (Year: 2019).*

(Continued)

*Primary Examiner* — Satwant K Singh
(74) *Attorney, Agent, or Firm* — Fish & Richardson P.C.

(57) ABSTRACT

This application discloses example text data processing method. One example method includes obtaining a target text. The target text can then be processed based on a noise generation model to obtain a noisy text, where when the noise generation model is trained, training data of the noise generation model at least includes a first text and a second text, the first text is a correct text corresponding to speech data, and the second text is obtained by performing speech recognition on the speech data by using a first speech recognition model. A text processing model can then be trained, by using at least the noisy text as training data, to obtain a trained text processing model.

20 Claims, 12 Drawing Sheets

(51) Int. Cl.
  *G06F 40/30* (2020.01)
  *G06F 40/40* (2020.01)
  *G10L 15/06* (2013.01)
  *G10L 15/16* (2006.01)
  *G10L 15/20* (2006.01)
  *G10L 15/22* (2006.01)

(52) U.S. Cl.
  CPC .............. *G06F 40/40* (2020.01); *G10L 15/16* (2013.01); *G10L 15/20* (2013.01); *G10L 15/22* (2013.01)

(56) References Cited

U.S. PATENT DOCUMENTS

| | | | | |
|---|---|---|---|---|
| 2018/0261225 | A1* | 9/2018 | Watanabe | G10L 15/28 |
| 2021/0350786 | A1* | 11/2021 | Chen | G10L 13/08 |
| 2022/0028371 | A1* | 1/2022 | Xu | G10L 15/063 |

FOREIGN PATENT DOCUMENTS

| | | |
|---|---|---|
| CN | 110830489 A | 2/2020 |
| CN | 111160568 A | 5/2020 |
| CN | 111951805 A | 11/2020 |

OTHER PUBLICATIONS

Pruthi et al., "Realistic Noisy Text Generation for Fortified NLP," ICML, Jun. 9, 2019, 9 pages.

Guu et al., "Generating Sentences by Editing Prototypes," Transactions of the Association for Computational Linguistics, vol. 6, Jul. 1, 2018, pp. 437-450.

Extended European Search Report in European AppIn No. 21838387.5, dated Oct. 30, 2023, 8 pages.

International Search Report and Written Opinion in International Appln. No. PCT/CN2021/104902, mailed on Sep. 24, 2021, 20 pages (with English translation).

* cited by examiner

TEXT DATA PROCESSING METHOD AND APPARATUS

CROSS-REFERENCE TO RELATED APPLICATIONS

This application is a continuation of International Application No. PCT/CN2021/104902, filed on Jul. 7, 2021, which claims priority to Chinese Patent Application No. 202010662105.9, filed on Jul. 10, 2020. The disclosures of the aforementioned applications are hereby incorporated by reference in their entireties.

TECHNICAL FIELD

This application relates to the field of artificial intelligence, and in particular, to a text data processing method and apparatus.

BACKGROUND

Artificial intelligence (artificial intelligence, AI) is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, so that the machines have perceiving, inference, and decision-making functions.

In recent years, with development of speech technology, a plurality of applications based on speech technology emerge, for example, speech assistant, smart home, and speech translation. Currently, in an application based on the speech technology in the industry, speech is first recognized by an automatic speech recognition (automatic speech recognition, ASR) module as a text, and then a text processing module processes the text, for example, performing speech translation and automatic response.

Due to interference of environment noise and user accents, a speech recognition model often has recognition errors, for example, homophones, paronyms, repetition, and wrong sentence segmentation. However, robustness of the text processing module, a downstream module in speech recognition, is weak, and the text processing module is very sensitive to noise of an input text. When there is noise in the input text, a correct result often cannot be obtained.

Currently, to improve robustness of a neural network model to a noisy input, noise of speech recognition may be introduced during model training. During existing implementation, to obtain a noisy text, some words in a correct text may be replaced with different words with similar pronunciations based on some dictionaries. However, the noisy text generated based on the method often cannot reflect an actual speech recognition error.

SUMMARY

According to a first aspect, this application provides a text data processing method, including:
obtaining a target text, where a training device may obtain the target text, the target text may be a text expressed in speech data, the speech data may be obtained by using a public speech recognition dataset or through manual collection, and the target text may be a correct text expressed by the speech data; and
processing the target text based on a noise generation model, to obtain a noisy text, where when the noise generation model is trained, training data of the noise generation model at least includes a first text and a second text, the first text is a correct text corresponding to the speech data, and the second text is a text obtained by performing speech recognition on the speech data by using a first speech recognition model; and training a text processing model by using at least the noisy text as training data, to obtain a trained text processing model.

The training device may obtain the speech data and the first text; process the speech data based on the first speech recognition model, to obtain the second text; process the first text based on an initial noise generation model, to obtain an output text; obtain a loss based on the output text and the second text; and update the initial noise generation model based on the loss until the loss meets a preset condition, to obtain the noise generation model.

The noise generation model in this embodiment of this application is obtained through training based on the correct text and a recognition result of the first speech recognition model. In comparison with a noisy text generation method based on word replacement, a noisy text generated by the noise generation model can better reflect an actual error of the noise generation model.

In an optional implementation, when an input of the noise generation model includes the first text, an output of the noise generation model includes the output text, and a difference between the output text and the second text falls within a preset range.

In an optional implementation, the trained text processing model is used to perform at least one of the following tasks: text translation, text semantic recognition, text classification, automatic question answering, information recommendation, and text emotion recognition.

In an optional implementation, a difference between the target text and the noisy text falls within the preset range.

When the difference between the target text and the noisy text is too large, it may be caused by performance of the noise generation model. In this special case, the noisy text cannot reflect an actual error of the noise generation model.

In an optional implementation, a pronunciation difference between the target text and the noisy text falls within the preset range; and/or a difference between a character string included in the target text and a character string included in the noisy text falls within the preset range.

In an optional implementation, the first text is different from the second text.

In an optional implementation, the processing the target text based on a noise generation model includes: processing the target text based on the noise generation model, to obtain a plurality of noisy texts and a confidence of each noisy text, and selecting one or more noisy texts from the plurality of noisy texts based on the confidence, where for example, a noisy text with a highest confidence or noisy texts with confidences that rank top may be selected; and the training a text processing model by using at least the noisy text as training data includes: training the text processing model by using the one or more noisy texts as training data.

In an optional implementation, the method further includes: obtaining to-be-recognized speech; processing the to-be-recognized speech based on a second speech recognition model, to obtain a recognition text; and processing the recognition text based on the trained text processing model, to obtain a processing result.

The first speech recognition model and the second speech recognition model may be the same or different. The noise generation model may learn performance of the first speech recognition model. When a same input text is processed, an output text similar to an output text of the first speech recognition model may be output. Correspondingly, the trained text processing model may have stronger robustness on an output of the first speech recognition model. Compared with data processing effect when the first speech recognition model is different from the second speech recognition model, effect of data processing performed on output data of the second speech recognition model by the text processing model is better when the first speech recognition model is the same as the second speech recognition model.

In an optional implementation, the noise generation model is at least one of the following: a bidirectional long short-term memory LSTM, a GPT (generative pre-training) model, and a LaserTagger model.

According to a second aspect, this application provides a model training method. The method includes: obtaining speech data and a first text, where the first text is a correct text corresponding to the speech data; processing the speech data based on a first speech recognition model, to obtain a second text; and training an initial noise generation model by using the first text and the second text as training data, to obtain a noise generation model.

In an optional implementation, the training an initial noise generation model by using the first text and the second text as training data includes:
 processing the first text based on the initial noise generation model, to obtain an output text; and
 obtaining a loss based on the output text and the second text, and updating the initial noise generation model based on the loss until the loss meets a preset condition, to obtain the noise generation model.

In an optional implementation, the noise generation model and the initial noise generation model each are at least one of the following: a bidirectional long short-term memory LSTM, a GPT (generative pre-training) model, and a LaserTagger model.

According to a third aspect, this application provides a text data processing method, including:
 obtaining to-be-recognized speech;
 processing the to-be-recognized speech based on a second speech recognition model, to obtain a recognition text; and
 processing the recognition text based on a trained text processing model, to obtain a processing result, where when a text processing model is trained, training data of the text processing model at least includes a noisy text, the noisy text is obtained by processing a target text based on a noise generation model, when the noise generation model is trained, training data of the noise generation model at least includes a first text and a second text, the first text is a correct text corresponding to speech data, and the second text is a text obtained by performing speech recognition on the speech data by using a first speech recognition model.

In an optional implementation, when an input of the noise generation model includes the first text, an output of the noise generation model includes the output text, and a difference between the output text and the second text falls within a preset range.

In an optional implementation, the trained text processing model is used to perform at least one of the following tasks: text translation, text semantic recognition, text classification, automatic question answering, information recommendation, and text emotion recognition.

In an optional implementation, a difference between the target text and the noisy text falls within the preset range.

In an optional implementation, the first text is different from the second text.

In an optional implementation, a pronunciation difference between the target text and the noisy text falls within the preset range; and/or
 a difference between a character string included in the target text and a character string included in the noisy text falls within the preset range.

According to a fourth aspect, this application provides a text data processing apparatus, including:
 an obtaining module, configured to obtain a target text;
 a text noise adding module, configured to process the target text based on a noise generation model, to obtain a noisy text, where when the noise generation model is trained, training data of the noise generation model at least includes a first text and a second text, the first text is a correct text corresponding to speech data, and the second text is a text obtained by performing speech recognition on the speech data by using a first speech recognition model; and
 a training module, configured to train a text processing model by using at least the noisy text as training data, to obtain a trained text processing model.

In an optional implementation, when an input of the noise generation model includes the first text, an output of the noise generation model includes the output text, and a difference between the output text and the second text falls within a preset range.

In an optional implementation, the trained text processing model is used to perform at least one of the following tasks: text translation, text semantic recognition, text classification, automatic question answering, information recommendation, and text emotion recognition.

In an optional implementation, a difference between the target text and the noisy text falls within the preset range.

In an optional implementation, the first text is different from the second text.

In an optional implementation, a pronunciation difference between the target text and the noisy text falls within the preset range; and/or a difference between a character string included in the target text and a character string included in the noisy text falls within the preset range.

In an optional implementation, the text noise adding module is configured to: process the target text based on the noise generation model, to obtain a plurality of noisy texts and a confidence of each noisy text; and select one or more noisy texts from the plurality of noisy texts based on the confidence. The training module is configured to train the text processing model by using the one or more noisy texts as training data.

In an optional implementation, the obtaining module is configured to obtain to-be-recognized speech.

A speech recognition module is configured to process the to-be-recognized speech based on a second speech recognition model, to obtain a recognition text.

A text processing module is configured to process the recognition text based on the trained text processing model, to obtain a processing result.

In an optional implementation, the obtaining module is configured to obtain the speech data and the first text.

The speech recognition module is configured to: process the speech data based on the first speech recognition model, to obtain the second text; and process the first text based on an initial noise generation model, to obtain the output text.

The training module is configured to: obtain a loss based on the output text and the second text, and update the initial noise generation model based on the loss until the loss meets a preset condition, to obtain the noise generation model.

In an optional implementation, the noise generation model is at least one of the following: a bidirectional long short-term memory LSTM, a GPT (generative pre-training) model, and a LaserTagger model.

According to a fifth aspect, this application provides a model training apparatus. The apparatus includes:
an obtaining module, configured to obtain speech data and a first text, where the first text is a correct text corresponding to the speech data;
a speech recognition module, configured to process the speech data based on a first speech recognition model, to obtain a second text; and
a training module, configured to train an initial noise generation model by using the first text and the second text as training data, to obtain a noise generation model.

In an optional implementation, the training module is configured to: process the first text based on the initial noise generation model, to obtain an output text; and
obtain a loss based on the output text and the second text, and update the initial noise generation model based on the loss until the loss meets a preset condition, to obtain the noise generation model.

In an optional implementation, the noise generation model and the initial noise generation model each are at least one of the following: a bidirectional long short-term memory LSTM, a GPT (generative pre-training) model, and a LaserTagger model.

According to a sixth aspect, this application provides a text data processing apparatus, including:
an obtaining module, configured to obtain to-be-recognized speech;
a speech recognition module, configured to process the to-be-recognized speech based on a second speech recognition model, to obtain a recognition text; and
a text processing module, configured to process the recognition text based on a trained text processing model, to obtain a processing result, where when a text processing model is trained, training data of the text processing model at least includes a noisy text, the noisy text is obtained by processing a target text based on a noise generation model, when the noise generation model is trained, training data of the noise generation model at least includes a first text and a second text, the first text is a correct text corresponding to speech data, and the second text is a text obtained by performing speech recognition on the speech data by using a first speech recognition model.

In an optional implementation, when an input of the noise generation model includes the first text, an output of the noise generation model includes the output text, and a difference between the output text and the second text falls within a preset range.

In an optional implementation, the trained text processing model is used to perform at least one of the following tasks: text translation, text semantic recognition, text classification, automatic question answering, information recommendation, and text emotion recognition.

In an optional implementation, a difference between the target text and the noisy text falls within the preset range.

In an optional implementation, the first text is different from the second text.

In an optional implementation, a pronunciation difference between the target text and the noisy text falls within the preset range; and/or
a difference between a character string included in the target text and a character string included in the noisy text falls within the preset range.

According to a seventh aspect, this application provides a text data processing method, including:
obtaining to-be-recognized speech;
processing the to-be-recognized speech based on a second speech recognition model, to obtain a recognition text;
processing the recognition text based on a text error correction model, to obtain a denoised text, where when the text error correction model is trained, training data of the text error correction model at least includes a first text and a second text, the first text is a correct text corresponding to speech data, and the second text is a text obtained by performing speech recognition on the speech data by using a first speech recognition model; and
processing the denoised text based on the text processing model, to obtain a processing result.

In an optional implementation, when an input of the text error correction model includes the second text, an output of the text error correction model includes an output text, and a difference between the output text and the first text falls within a preset range.

In an optional implementation, the first text is different from the second text.

According to an eighth aspect, this application provides a text data processing apparatus, including:
an obtaining module, configured to obtain to-be-recognized speech;
a speech recognition module, configured to process the to-be-recognized speech based on a second speech recognition model, to obtain a recognition text;
a text error correction module, configured to process the recognition text based on a text error correction model, to obtain a denoised text, where when the text error correction model is trained, training data of the text error correction model at least includes a first text and a second text, the first text is a correct text corresponding to speech data, and the second text is a text obtained by performing speech recognition on the speech data by using a first speech recognition model; and
a text processing module, configured to process the denoised text based on the text processing model, to obtain a processing result.

In an optional implementation, when an input of the text error correction model includes the second text, an output of the text error correction model includes an output text, and a difference between the output text and the first text falls within a preset range.

In an optional implementation, the first text is different from the second text.

According to a ninth aspect, this application provides a text data processing apparatus, including a processor. The processor is coupled to a memory. The memory stores program instructions, and when the program instructions stored in the memory are executed by the processor, the method in the first aspect is implemented. For steps performed by the processor in the possible implementations of the first aspect, refer to the first aspect. Details are not described herein again.

According to a tenth aspect, this application provides a model training apparatus, including a processor. The processor is coupled to a memory. The memory stores program instructions, and when the program instructions stored in the memory are executed by the processor, the method in the first aspect is implemented. For steps performed by the processor in the possible implementations of the second aspect, refer to the second aspect. Details are not described herein again.

According to an eleventh aspect, this application provides a text data processing apparatus, including a processor. The processor is coupled to a memory. The memory stores program instructions, and when the program instructions stored in the memory are executed by the processor, the method in the third aspect is implemented. For steps performed by the processor in the possible implementations of the third aspect, refer to the third aspect. Details are not described herein again.

According to a twelfth aspect, this application provides a text data processing apparatus, including a processor. The processor is coupled to a memory. The memory stores program instructions, and when the program instructions stored in the memory are executed by the processor, the method in the seventh aspect is implemented. For steps performed by the processor in the possible implementations of the seventh aspect, refer to the seventh aspect. Details are not described herein again.

According to a thirteenth aspect, this application provides a computer-readable storage medium. The computer-readable storage medium stores a computer program, and when the computer program is run on a computer, the computer is enabled to perform the method in the first aspect.

According to a fourteenth aspect, this application provides a computer-readable storage medium. The computer-readable storage medium stores a computer program, and when the computer program is run on a computer, the computer is enabled to perform the method in the second aspect.

According to a fifteenth aspect, this application provides a computer-readable storage medium. The computer-readable storage medium stores a computer program, and when the computer program is run on a computer, the computer is enabled to perform the method in the third aspect.

According to a sixteenth aspect, this application provides a computer-readable storage medium. The computer-readable storage medium stores a computer program, and when the computer program is run on a computer, the computer is enabled to perform the method in the seventh aspect.

According to a seventeenth aspect, this application provides a circuit system. The circuit system includes a processing circuit, and the processing circuit is configured to perform the method in the first aspect.

According to an eighteenth aspect, this application provides a circuit system. The circuit system includes a processing circuit, and the processing circuit is configured to perform the method in the second aspect.

According to a nineteenth aspect, this application provides a circuit system. The circuit system includes a processing circuit, and the processing circuit is configured to perform the method in the third aspect.

According to a twentieth aspect, this application provides a circuit system. The circuit system includes a processing circuit, and the processing circuit is configured to perform the method in the seventh aspect.

According to a twenty-first aspect, this application provides a computer program. When the computer program is run on a computer, the computer is enabled to perform the method in the first aspect.

According to a twenty-second aspect, this application provides a computer program. When the computer program is run on a computer, the computer is enabled to perform the method in the second aspect.

According to a twenty-third aspect, this application provides a computer program. When the computer program is run on a computer, the computer is enabled to perform the method in the third aspect.

According to a twenty-fourth aspect, this application provides a computer program. When the computer program is run on a computer, the computer is enabled to perform the method in the seventh aspect.

According to a twenty-fifth aspect, this application provides a chip system. The chip system includes a processor, configured to support a server or a threshold obtaining apparatus in implementing functions in the foregoing aspects, for example, sending or processing data and/or information in the foregoing methods. In a possible design, the chip system further includes a memory. The memory is configured to store program instructions and data that are necessary for a server or a communication device. The chip system may include a chip, or may include a chip and another discrete component.

DESCRIPTION OF EMBODIMENTS

The following describes embodiments of the present invention with reference to the accompanying drawings in embodiments of the present invention. Terms used in embodiments of the present invention are merely intended to explain specific embodiments of the present invention, and are not intended to limit the present invention.

The following describes embodiments of this application with reference to the accompanying drawings. A person of ordinary skill in the art may learn that as a technology evolves and a new scenario emerges, technical solutions provided in embodiments of this application are also applicable to a similar technical problem.

In the specification, claims, and the accompanying drawings of this application, terms "first", "second", and the like are intended to distinguish similar objects but do not necessarily indicate a specific order or sequence. It should be understood that the terms used in such a way are interchangeable in proper circumstances, which is merely a discrimination manner that is used when objects having a same attribute are described in embodiments of this application. In addition, terms "include", "contain" and any other variants mean to cover the non-exclusive inclusion, so that a process, method, system, product, or device that includes a series of units is not limited to those units, but may include other units not expressly listed or inherent to such a process, method, system, product, or device.

Figure 1:
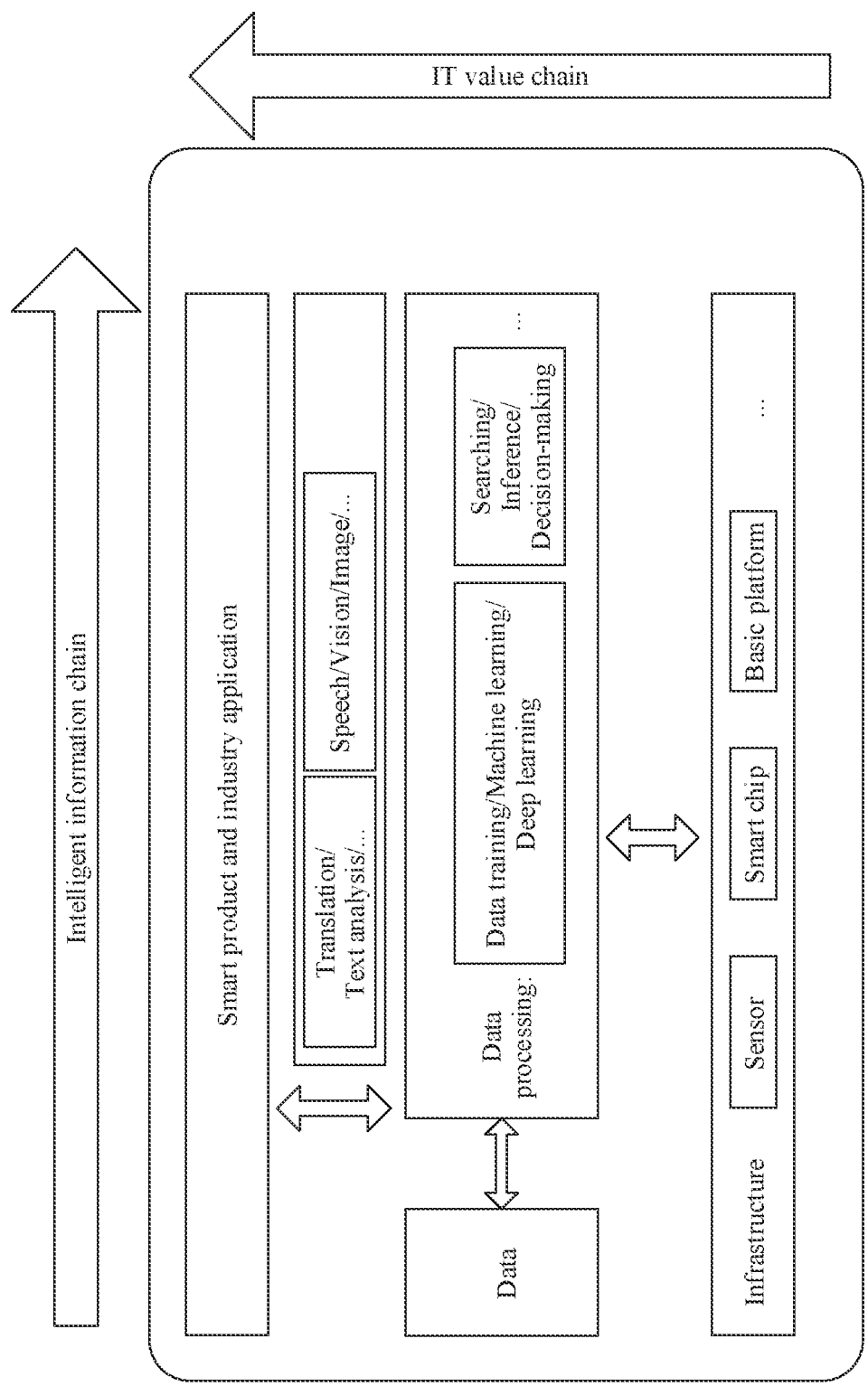
FIG. 1 is a schematic diagram of a structure of an artificial intelligence main framework.

An overall working procedure of an artificial intelligence system is first described. Refer to FIG. 1. FIG. 1 shows a schematic diagram of a structure of an artificial intelligence main framework. The following describes the artificial intelligence main framework from two dimensions: an "intelligent information chain" (horizontal axis) and an "IT value chain" (vertical axis). The "intelligent information chain" reflects a series of processes from obtaining data to processing the data. For example, the process may be a general process of intelligent information perception, intelligent information representation and formation, intelligent inference, intelligent decision-making, and intelligent execution and output. In these processes, the data undergoes a refinement process of "data-information-knowledge-intelligence". The "IT value chain" reflects a value brought by artificial intelligence to the information technology industry from an underlying infrastructure and information (technology providing and processing implementation) of human intelligence to an industrial ecological process of a system.

(1) Infrastructure

The infrastructure provides computing capability support for the artificial intelligence system, implements communication with the external world, and implements support by using a basic platform. The infrastructure communicates with the outside by using a sensor. A computing capability is provided by a smart chip (a hardware acceleration chip such as a CPU, an NPU, a GPU, an ASIC, or an FPGA). The basic platform of the infrastructure includes related platforms, for example, a distributed computing framework and a network, for assurance and support, including cloud storage and computing, an interconnection network, and the like. For example, the sensor communicates with the outside to obtain data, and the data is provided to a smart chip in a distributed computing system provided by the basic platform for computing.

(2) Data

Data at an upper layer of the infrastructure is used to indicate a data source in the field of artificial intelligence. The data relates to a graph, an image, speech, and text, further relates to Internet of things data of a conventional device, and includes service data of an existing system and perception data such as force, displacement, a liquid level, a temperature, and humidity.

(3) Data Processing

Data processing usually includes a manner such as data training, machine learning, deep learning, searching, inference, or decision-making.

Machine learning and deep learning may mean performing symbolic and formalized intelligent information modeling, extraction, preprocessing, training, and the like on data.

Inference is a process in which a human intelligent inferring manner is simulated in a computer or an intelligent system, and machine thinking and problem resolving are performed by using formal information according to an inferring control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may further be formed based on a data processing result, for example, an algorithm or a general system, such as translation, text analysis, computer vision processing, speech recognition, and image recognition.

(5) Smart Product and Industry Application

The smart product and the industry application are a product and an application of the artificial intelligence system in various fields, and are package of an overall solution of the artificial intelligence, so that decision-making for intelligent information is productized and an application is implemented. Application fields mainly include a smart terminal, smart transportation, smart health care, autonomous driving, a safe city, and the like.

The following describes several application scenarios of this application.

Figure 2A:
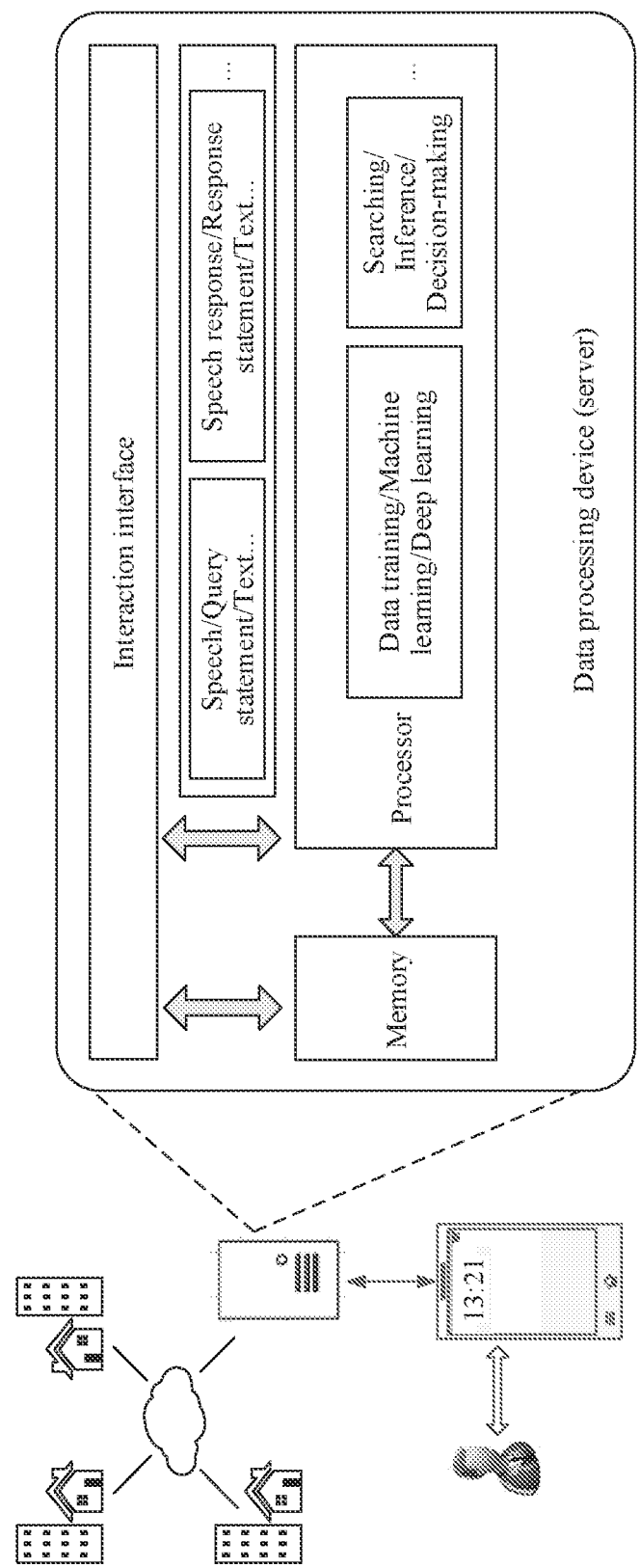
FIG. 2a is a natural language processing system.

FIG. 2a shows a natural language processing system. The natural language processing system includes user equipment and a data processing device. The user equipment includes a smart terminal such as a mobile phone, a personal computer, or an information processing center. The user equipment is an initiating end of natural language data processing. As an initiator of a request for language questioning and answering, querying, or the like, a user usually initiates the request by using the user equipment.

The data processing device may be a device or a server with a data processing function, such as a cloud server, a network server, an application server, or a management server. The data processing device receives, through an interaction interface, a question of a query statement, speech, text, or the like from the smart terminal, and then performs language data processing by using a memory storing data and a processor processing data in a manner of machine learning, deep learning, searching, inference, decision-making, or the like. The memory in the data processing device may be a general name, including a local storage and a database storing historical data. The database may be in the data processing device, or may be in another network server.

In the natural language processing system shown in FIG. 2a, the user equipment may receive instructions of the user. For example, the user equipment may receive a text entered by the user, and then initiate a request to the data processing device, so that the data processing device executes a natural language processing application (for example, text classification, text inference, named entity recognition, or translation) for the text obtained by the user equipment, to obtain a processing result (for example, a processing result, an inference result, a named entity recognition result, or a translation result) of the corresponding natural language processing application for the text. For example, the user equipment may receive a Chinese text entered by the user, and then initiate a request to the data processing device, so that the data processing device performs entity classification on the Chinese text, to obtain an entity processing result for the Chinese text. For example, the user equipment may receive a Chinese text entered by the user, and then initiate a request to the data processing device, so that the data processing device translates the Chinese text into English, to obtain an English translation for the Chinese text.

In FIG. 2a, the data processing device may perform a text data processing method according to an embodiment of this application.

Figure 2B:
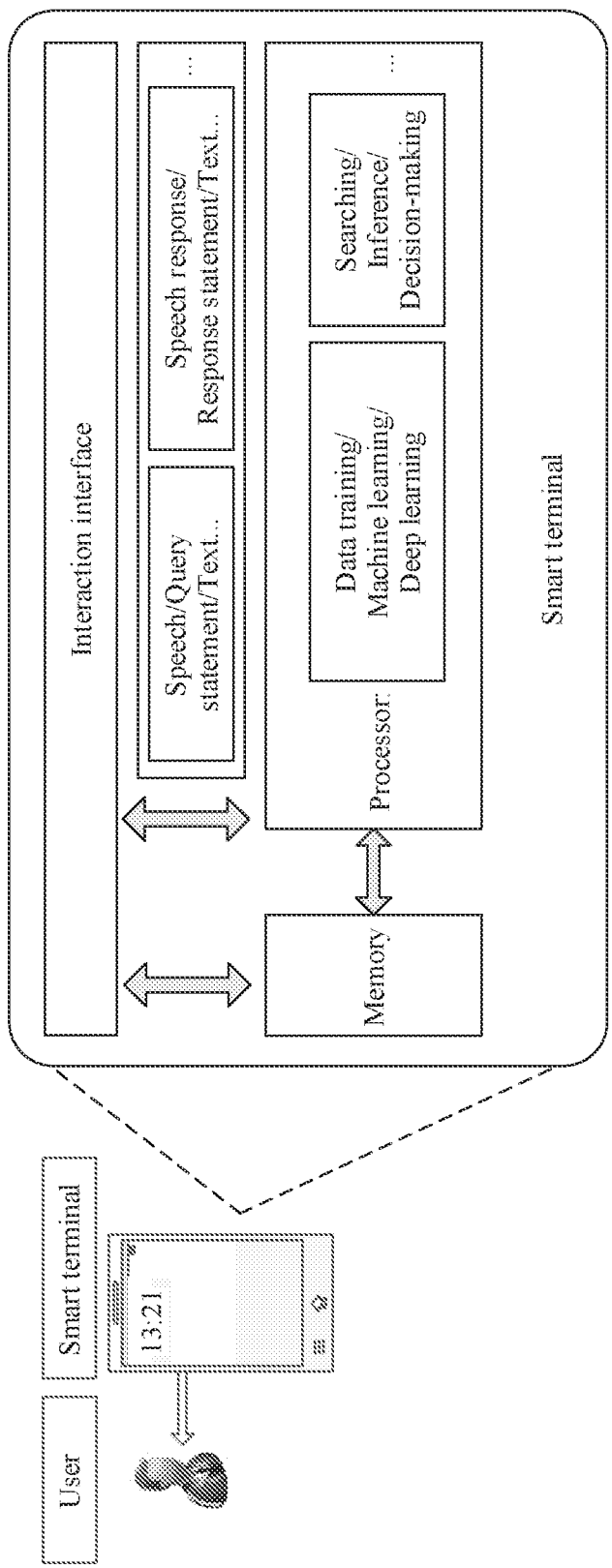
FIG. 2b is another natural language processing system.

FIG. 2b shows another natural language processing system. In FIG. 2b, user equipment is directly used as a data processing device. The user equipment can directly receive an input from a user, and the input is directly processed by using hardware of the user equipment. A specific process is similar to that in FIG. 2a. For details, refer to the foregoing descriptions. Details are not described herein again.

In the natural language processing system shown in FIG. 2b, the user equipment may receive instructions of the user. For example, the user equipment may receive speech provided by the user, generate a text corresponding to the speech, and then execute a natural language processing application (for example, text classification, text inference, named entity recognition, or translation) for the text, to obtain a processing result (for example, a processing result, an inference result, a named entity recognition result, or a translation result) of the corresponding natural language processing application for the text.

In FIG. 2b, the user equipment may independently perform a text data processing method according to an embodiment of this application.

Figure 2C:
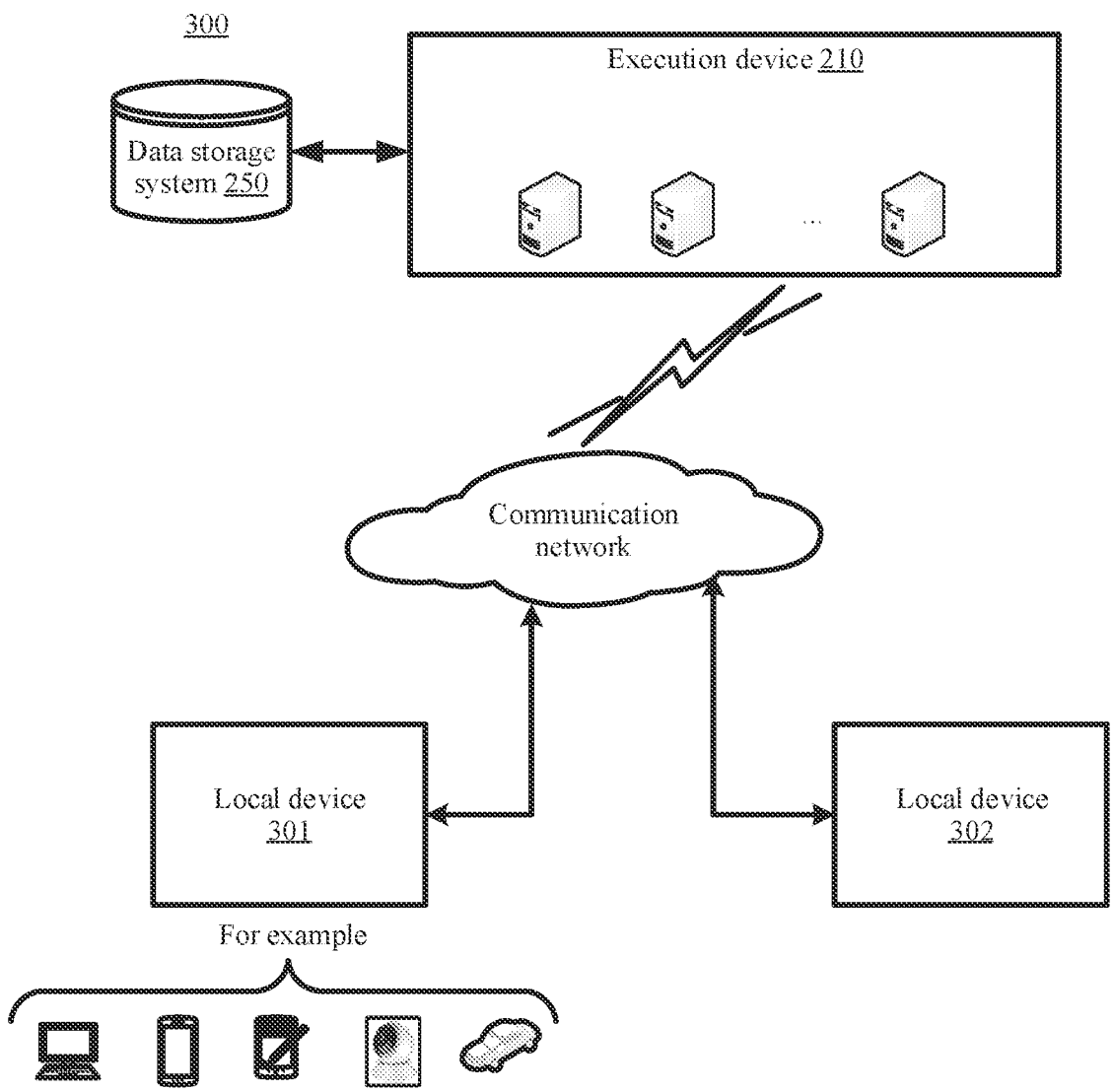
FIG. 2c is a schematic diagram of a device related to natural language processing according to an embodiment of this application.

FIG. 2c is a schematic diagram of a device related to natural language processing according to an embodiment of this application.

The user equipment in FIG. 2a and FIG. 2b may specifically be a local device 301 or a local device 302 in FIG. 2c, and the data processing device in FIG. 2a may specifically be an execution device 210 in FIG. 2c. A data storage system 250 may store to-be-processed data of the execution device 210. The data storage system 250 may be integrated on the execution device 210, or may be disposed on a cloud or another network server.

The processor in FIG. 2a and FIG. 2b may perform data training/machine learning/deep learning by using a neural network model or another model (for example, a model based on a support vector machine), and execute a natural language processing application (for example, text classification, sequence labeling, reading comprehension, text generation, text inference, or translation) for a text sequence based on a final model obtained through data training or learning, to obtain a corresponding processing result.

Figure 3:
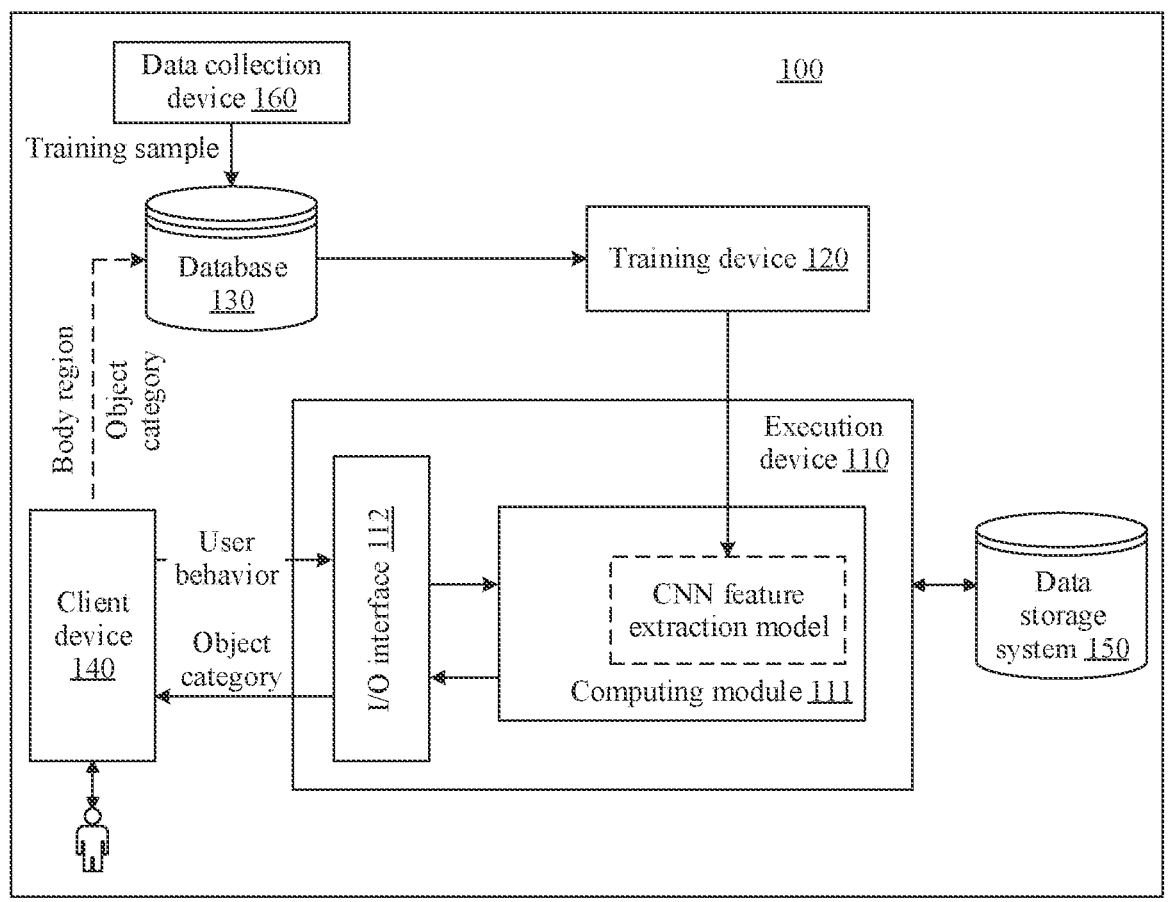
FIG. 3 is a schematic diagram of an architecture of a system 100 according to an embodiment of this application.

FIG. 3 is a schematic diagram of an architecture of a system 100 according to an embodiment of this application. In FIG. 3, an execution device 110 configures an input/output (input/output, I/O) interface 112, configured to exchange data with an external device. A user may input data to the I/O interface 112 by using a client device 140. The input data in this embodiment of this application may include each to-be-scheduled task, a resource that can be invoked, and another parameter.

In a process in which the execution device 110 preprocesses the input data, or in a process in which a computing module 111 of the execution device 110 performs computing (for example, implementing a function of a neural network in this application), the execution device 110 may invoke data, code, and the like in a data storage system 150 for corresponding processing, and may further store, in the data storage system 150, data, an instruction, and the like that are obtained through the corresponding processing.

Finally, the I/O interface 112 returns a processing result to the client device 140, and provides the processing result to the user.

It should be noted that a training device 120 may generate corresponding target models/rules for different targets or different tasks based on different training data. The corresponding target models/rules may be used to implement the foregoing targets or complete the foregoing tasks, to provide a required result for the user. The training data may be stored in a database 130, and is a training sample collected by the data collection device 160.

In a case shown in FIG. 3, the user may manually input data and the user may input the data on an interface provided by the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may alternatively be used as a data collection end, to collect, as new sample data, input data that is input to the I/O interface 112 and an output result that is output from the I/O interface 112 that are shown in the figure, and store the new sample data in the database 130. It is clear that the client device 140 may alternatively not perform collection. Instead, the I/O interface 112 directly stores, in the database 130 as new sample data, the input data input to the I/O interface 112 and the output result output from the I/O interface 112.

It should be noted that FIG. 3 is merely a schematic diagram of the system architecture according to an embodiment of this application. A location relationship between a device, a component, a module, and the like shown in the figure constitutes no limitation. For example, in FIG. 3, the data storage system 150 is an external memory relative to the execution device 110. In another case, the data storage system 150 may alternatively be disposed in the execution device 110. As shown in FIG. 3, a neural network may be obtained through training based on the training device 120.

An embodiment of this application further provides a chip. The chip includes a neural network processing unit NPU. The chip may be disposed in the execution device 110 shown in FIG. 3, to complete computing work of the computing module 111. The chip may alternatively be disposed in the training device 120 shown in FIG. 3, to complete training work of the training device 120 and output the target model/rule.

The neural network processing unit NPU serves as a coprocessor, and may be disposed on a host central processing unit (central processing unit, CPU) (host CPU). The host CPU assigns a task. A core part of the NPU is an operation circuit, and a controller controls the operation circuit to extract data in a memory (a weight memory or an input memory) and perform an operation.

In some implementations, the operation circuit includes a plurality of processing engines (process engine, PE) inside. In some implementations, the operation circuit is a two-dimensional systolic array. The operation circuit may alternatively be a one-dimensional systolic array or another electronic circuit capable of performing mathematical operations such as multiplication and addition. In some implementations, the operation circuit is a general-purpose matrix processor.

For example, it is assumed that there are an input matrix A, a weight matrix B, and an output matrix C. The operation circuit fetches, from a weight memory, data corresponding to the matrix B, and caches the data on each PE in the operation circuit. The operation circuit fetches data of the matrix A from an input memory, to perform a matrix operation on the matrix B, and stores an obtained partial result or an obtained final result of the matrix in an accumulator (accumulator).

A vector calculation unit may perform further processing such as vector multiplication, vector addition, an exponent operation, a logarithm operation, or value comparison on an output of the operation circuit. For example, the vector calculation unit may be configured to perform network calculation, such as pooling (pooling), batch normalization (batch normalization), or local response normalization (local response normalization) at a non-convolutional/non-FC layer in a neural network.

In some implementations, the vector calculation unit can store a processed output vector in a unified memory. For example, the vector calculation unit may apply a non-linear function to an output, for example, a vector of an accumulated value, of the operation circuit to generate an activation value. In some implementations, the vector calculation unit generates a normalized value, a combined value, or both a normalized value and a combined value. In some implementations, the processed output vector can be used as an activated input to the operation circuit, for example, the processed output vector can be used at a subsequent layer of the neural network.

A unified memory is configured to store input data and output data.

For weight data, a direct memory access controller (direct memory access controller, DMAC) directly transfers input data in an external memory to the input memory and/or the unified memory, stores weight data in the external memory in the weight memory, and stores data in the unified memory in the external memory.

A bus interface unit (bus interface unit, BIU) is configured to implement interaction between the host CPU, the DMAC, and an instruction fetch buffer by using a bus.

The instruction fetch buffer (instruction fetch buffer) connected to the controller is configured to store instructions used by the controller.

The controller is configured to invoke the instructions cached in the instruction fetch buffer, to implement a working process of controlling an operation accelerator.

Usually, the unified memory, the input memory, the weight memory, and the instruction fetch buffer may all be on-chip (on-chip) memories. The external memory may be a memory outside the NPU, and the external memory may be a double data rate synchronous dynamic random access memory (double data rate synchronous dynamic random access memory, DDR SDRAM), a high bandwidth memory (high bandwidth memory, HBM), or another readable and writable memory.

Because embodiments of this application relate to massive application of a neural network, for ease of understanding, the following first describes terms and concepts related to the neural network in embodiments of this application.

(1) Neural Network

The neural network may include a neuron. The neuron may be an operation unit that uses xs and an intercept of 1 as an input. An output of the operation unit may be as follows:

$$h_{W,b}(x)=f(W^Tx)=f(\Sigma_{s=1}^{n}W_s x_s+b) \quad (1\text{-}1)$$

$s=1, 2, \ldots,$ or n, n is a natural number greater than 1, $W_s$ is a weight of $x_s$, and b is bias of the neuron. f is an activation function (activation function) of the neuron, used to introduce a non-linear feature into the neural network, to convert an input signal in the neuron into an output signal. The output signal of the activation function may serve as an input of a next convolution layer. The activation function may be a sigmoid function. The neural network is a network constituted by connecting a plurality of single neurons together. To be specific, an output of a neuron may be an input to another neuron. An input of each neuron may be connected to a local receptive field of a previous layer to extract a feature of the local receptive field. The local receptive field may be a region including several neurons.

Work at each layer of the neural network may be described by using a mathematical expression $\vec{y}=a(\vec{x}+b)$. From a physical layer, work at each layer of the neural network may be understood as completing transformation from input space to output space (namely, from row space to column space of a matrix) by performing five operations on the input space (a set of input vectors). The five operations are as follows: 1. dimension increasing/dimension reduction; 2. scaling up/scaling down; 3. rotation; 4. translation; and 5. "bending". The operation 1, the operation 2, and the operation 3 are performed by $W\vec{x}$, the operation 4 is performed by +b, and the operation 5 is performed by a( ). The word "space" is used herein for expression because a classified object is not a single thing, but a type of things. Space is a collection of all individuals of such type of things. W is a weight vector, and each value in the vector indicates a weight value of one neuron in the neural network at this layer. The vector W determines space transformation from the input space to the output space described above. In other words, a weight W at each layer controls how to transform space. A purpose of training the neural network is to finally obtain a weight matrix (a weight matrix formed by vectors W at a plurality of layers) at all layers of a trained neural network. Therefore, the training process of the neural network is essentially a manner of learning control of space transformation, and more specifically, learning a weight matrix.

Because it is expected that an output of the neural network is as close as possible to a value that is actually expected to be predicted, a current predicted value of the network may be compared with a target value that is actually expected, and then a weight vector at each layer of the neural network is updated based on a difference between the current predicted value and the target value (there is usually an initialization process before the first update, that is, a parameter is preconfigured for each layer of the neural network). For example, if the predicted value of the network is large, the weight vector is adjusted to lower the predicted value until the neural network can predict the target value that is actually expected. Therefore, "how to obtain, through comparison, the difference between the predicted value and the target value" needs to be predefined. This is a loss function (loss function) or an objective function (objective function). The loss function and the objective function are important equations used to measure the difference between the predicted value and the target value. The loss function is used as an example. A higher output value (loss) of the loss function indicates a larger difference. Therefore, training of the neural network is a process of minimizing the loss as much as possible.

(2) Back Propagation Algorithm

A neural network may use an error back propagation (back propagation, BP) algorithm to correct a value of a parameter in an initial neural network model in a training process, so that a reconstruction error loss of the neural network model becomes smaller. Specifically, an input signal is transferred forward until an error loss occurs at an output, and the parameter in the initial neural network model is updated based on back propagation error loss information, to make the error loss converge. The back propagation algorithm is an error-loss-centered back propagation motion intended to obtain a parameter, such as a weight matrix, of an optimal neural network model.

(3) Natural Language Processing (Natural Language Processing, NLP)

Natural language (natural language) is human language, and natural language processing (NLP) is processing of human language. Natural language processing is a process of systematic analysis, understanding, and information extraction of text data in an intelligent and efficient manner. By using NLP and components of NLP, large chunks of text data can be managed, or a lot of automated tasks can be performed, and various problems can be resolved, for example, automatic summarization (automatic summarization), machine translation (machine translation, MT), named entity recognition (named entity recognition, NER), relation extraction (relation extraction, RE), information extraction (information extraction, IE), emotion analysis, speech recognition (speech recognition), a question answering (question answering) system, and topic segmentation.

For example, there may be the following types of natural language processing tasks.

Sequence labeling: A model needs to provide a classification category for each word in a sentence based on a context. For example, the sequence labeling is Chinese word segmentation, part-of-speech tagging, named entity recognition, or semantic role tagging.

Classification task: A classification value is output for the entire sentence. For example, the classification task is text classification.

Sentence relation inference: Two sentences are given, and whether the two sentences have a nominal relation is determined. For example, the sentence relation inference is entailment, QA, semantic rewriting, or natural language inference.

Generative task: One piece of text is output and another piece of text is generated. For example, the generative task is machine translation, text summarization, writing poems and sentences, describing a picture orally.

The following provides some natural language processing examples.

Word segmentation (word segmentation or word breaker, WB): Continuous natural language data is segmented into lexical sequences with semantic rationality and integrity, to eliminate a cross ambiguity. Example sentence: zhi bi ye he shang wei bi ye de tong xue. Word segmentation 1: zhi biye he shangwei biye de tongxue. Word segmentation 2: zhi biye heshang wei biye de tongxue.

Named entity recognition (named entity recognition, NER): Entities (person, place, institution, time, works, and the like) having specific meanings in natural language data are recognized, to integrate unknown words at a granularity. Example sentence: tian shi ai mei li zai xian guan kan. Word segmentation: tianshi ai meili zaixian guankan. Entity: Angel Amelie->Movie.

Part-of-speech tagging (part-of-speech tagging): A part-of-speech (noun, verb, adjective, or the like) is assigned to each word in natural language data. Dependency parsing (dependency parsing): Syntactic elements (subject, predicate, object, attributive, adverbial, complement, and the like) in a sentence are automatically analyzed, to eliminate a structural ambiguity. Comment: fang jian li hai ke yi xin shang ri chu. Ambiguity 1: fang jian hai ke yi. Ambiguity 2: ke yi xin shang ri chu. Part of speech: fang jian li (subject), hai ke yi (predicate), xin shang ri chu (verb-object phrase).

Word vector and semantic similarity (word embedding&semantic similarity): Words are represented in a vectorized manner, and semantic similarity calculation is performed on the words based on the vectorized representation, to resolve a problem of linguistic similarity between the words. For example, which one (dai gua/cao mei) does xi gua approximate? Vectorized representation: xi gua (0.1222, 0.22333, . . . ); similarity calculation: dai gua (0.115) and cao mei (0.325); and vectorized representation: (−0.333, 0.1223, . . . ) (0.333, 0.3333, . . . ).

Text semantic similarity (text semantic similarity): Based on massive data in the entire network and a deep neural network technology, semantic similarity between texts is calculated, to resolve a problem of text semantic similarity. For example, which one (qian pai zhao zen me zhuang/ru he ban li Beijing pai zhao) does che tou ru he fang zhi che pai approximate? Vectorized representation: che tou ru he fang zhi che pai (0.1222, 0.22333, . . . ); similarity calculation: qian pai zhao zen me zhuang (0.762) and ru he ban li Beijing pai zhao (0.486); and vector representation: (−0.333, 0.1223, . . . ) (0.333, 0.3333, . . . ).

(4) Language Model (Language Model, LM)

The language model is a basic model in NPL. Through a large amount of corpus training and learning, the LM can infer a probability of an unknown word based on existing information (for example, text information such as a word that is present in a context). The LM may also be understood as a probability model used to calculate a probability of a sentence. In other words, the language model is probability distribution of a natural language data sequence, and the probability distribution indicates a possibility of existence of a text with a specific sequence and a specific length. In short, the language model predicts a next word based on a context. Because there is no need to manually tag a corpus, the language model can learn rich semantic knowledge from an unlimited large-scale corpus.

(5) Large Scale Pre-Trained Language Model (Large Scale Pre-Trained Language Model)

The large-scale pre-trained language model may also be referred to as a large-scale language pre-trained model. Generally, by using a large-scale corpus (for example, language training materials such as sentences and paragraphs), a language model training task is designed, and a large-scale neural network algorithm structure is trained to learn; and a finally obtained large-scale neural network algorithm structure is the large-scale pre-trained language model. For another subsequent task, feature extraction or task fine-tuning may be performed based on the model to fulfill a specific task. An idea of pre-training is to first train a task to obtain a set of model parameters, then initialize network model parameters by using the set of model parameters, and then train another task by using an initialized network model, to obtain a model adapted to the another task. Through pre-training by using the large-scale corpus, a neural language representation model can learn a powerful language representation capability and can extract rich syntactic and semantic information from a text. The large-scale pre-trained language model may provide a sentence-level feature and a token that includes rich semantic information used by a downstream task, or perform fine-tuning (fine-tune) for a downstream task directly on the basis of the pre-trained model. In this way, a downstream dedicated model is quickly and conveniently obtained.

The following describes the method provided in this application from a neural network training side and a neural network application side.

A neural network training method provided in embodiments of this application relates to natural language data processing, and may specifically be applied to data processing methods such as data training, machine learning, and deep learning. Symbolized and formalized intelligent information modeling, extraction, preprocessing, training, and the like are performed on training data (for example, a noisy text in this application), to finally obtain a trained text processing model. In addition, in a text data processing method provided in embodiments of this application, the trained text processing model may be used to input input data (for example, a target text and a noisy text in this application) to the trained text processing model, to obtain output data (for example, a processing result of the text processing model in this application). It should be noted that the text processing model training method and the text processing method provided in embodiments of this application are inventions generated based on a same idea, or may be understood as two parts of a system or two phases of an entire process, for example, a model training phase and a model application phase.

Figure 4A:
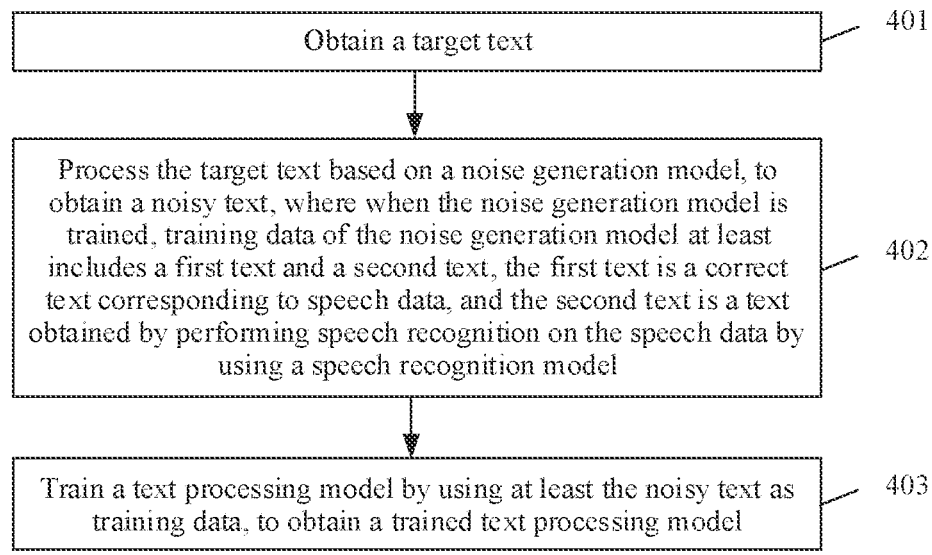
FIG. 4a is a text data processing method according to an embodiment of this application.

FIG. 4a is a text data processing method according to an embodiment of this application. As shown in FIG. 4a, the text data processing method provided in this embodiment includes the following steps.

401: Obtain a target text.

In this embodiment of this application, a training device may obtain the target text. The target text may be a text expressed in speech data, and the speech data may be obtained by using a public speech recognition dataset or through manual collection. The target text may be a correct text expressed by the speech data.

402: Process the target text based on a noise generation model, to obtain a noisy text, where when the noise generation model is trained, training data of the noise generation model at least includes a first text and a second text, the first text is a correct text corresponding to speech data, and the second text is a text obtained by performing speech recognition on the speech data by using a first speech recognition model.

In this embodiment of this application, after obtaining the target text, the training device may process the target text based on the noise generation model, to obtain the noisy text. The following describes how to train the noise generation model.

In this embodiment of this application, the training device may obtain the speech data and the first text; process the speech data based on the first speech recognition model, to obtain the second text; process the first text based on an initial noise generation model, to obtain an output text; obtain a loss based on the output text and the second text; and update the initial noise generation model based on the loss until the loss meets a preset condition, to obtain the noise generation model.

Specifically, a recognition result may be obtained by processing the speech data based on the first speech recognition model. However, a recognition result obtained by a speech recognition model may be inaccurate. For example, the first speech recognition model processes a sentence: "where are you going?", to obtain a recognition result: "what are you going?".

Therefore, when the recognition result is inaccurate, the recognition result is the second text different from the first text (the correct result). In this embodiment, the training device may form a sentence pair including the result (the second text) obtained by processing the speech data based on the first speech recognition model and a standard sentence (the first text), and train the noise generation model based on a standard-noise sentence pair.

Optionally, the noise generation model in this embodiment may be a text generation model or a text editing model. The text generation model may be a bidirectional long short-term memory (long short-term memory, LSTM), a GPT (generative pre-training) model, or the like. The text editing model may be a LaserTagger model of Google or the like.

An input of the text generation model is a sequence of segmentation words of the target text, and an output is a sequence of segmentation words of the noisy text. An input of the text editing model is the sequence of segmentation words of the target text, and an output is a modification manner of the input text. The input text may be modified as the noisy text based on the modification manner.

For a trained model, the correct text is input, to generate sentences with possible speech recognition errors. For example, a sentence "The priest tied the knot." is input, and the model may generate sentences such as "The priest told the knot." and "The priest tied the night." Pronunciation of the sentences is similar to that of the original sentence, and the sentences are possible errors of a speech recognition system.

In this embodiment, the target text may be processed based on the noise generation model, to obtain a plurality of noisy texts and a confidence of each noisy text, and one or more noisy texts are selected from the plurality of noisy texts based on the confidence. For example, a noisy text with a highest confidence or noisy texts with confidences that rank top may be selected.

In this embodiment of this application, a difference between the target text and the noisy text falls within the preset range. Specifically, a difference between a character string included in the target text and a character string included in the noisy text falls within the preset range; and/or a difference between a character string included in the target text and a character string included in the noisy text falls within the preset range.

Optionally, in this embodiment of this application, the obtained noisy text may be compared with the target text, and an adversarial sample may be selected based on an editing rate of a pronunciation sequence. The step is mainly to filter out samples with too much noise. The samples have large negative impact on a downstream text processing model. The pronunciation sequence can be obtained through a linguistic dictionary. For example, Chinese can be represented by pinyin, and English can be represented by phonetic symbols. For example, in English, a pronunciation sequence of "The priest tied the knot." is ['DH', 'AH0', 'P', 'R', 'IY1', 'S', 'T', 'T', 'AY1', 'D', 'DH', 'AH0', 'N', 'AA1', 'T']. An editing distance is a minimum quantity of editing operations that are required to convert from one character string to another character string. Allowed editing operations include replacing one character with another, inserting one character, and deleting one character. The editing rate is obtained by dividing the editing distance by a length of the target text, and the length of the target text may be represented by a quantity of words of the target text. In this embodiment, the editing rate may be used to measure a noise degree of a noisy sentence generated by the noise generation model compared with an original sentence, and a threshold is set, to filter out a noisy text whose average editing rate is greater than the threshold.

For example, the original sentence is "The priest tied the knot.", and a pronunciation sequence is ['DH', 'AH0', 'P', 'R', 'IY1', 'S', 'T', 'T', 'AY1', 'D', 'DH', 'AH0', 'N', 'AA1', 'T']. The generated noisy texts include:

"The priest told the knot.", where a pronunciation sequence is ['DH', 'AH0', 'P', 'R', 'IY1', 'S', 'T', 'T', 'UW1', 'Y', 'UW1', 'Y', 'UW1'], and an editing rate is 0.4; and "The priest to you, you.", where a pronunciation sequence is ['DH', 'AH0', 'P', 'R', 'IY1', 'S', 'T', 'T', 'UW1', 'Y', 'UW1', 'Y', 'UW1'], and an editing rate is 1.4. If the threshold is set to 1.0, the second noisy text is filtered out.

Figure 4B:
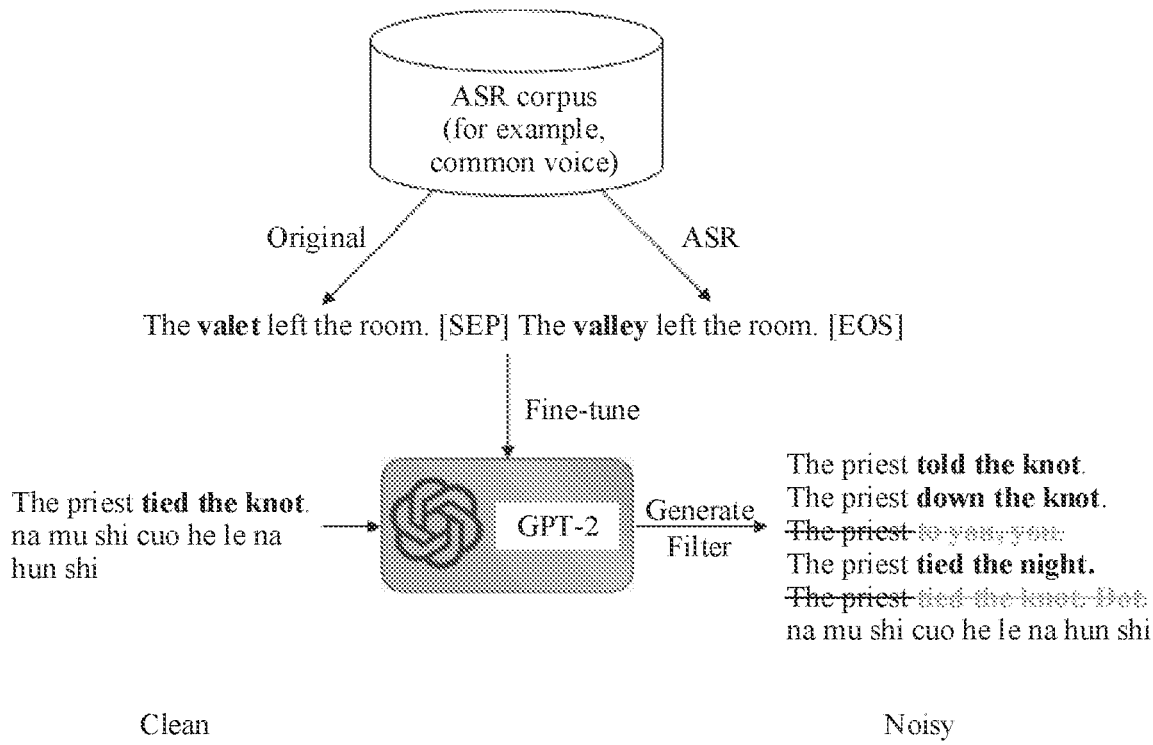
FIG. 4b is a text data processing method according to an embodiment of this application.

Refer to FIG. 4b. For example, in a specific implementation, a public speech recognition dataset, for example, Common Voice, may be collected, and speech recognition is performed on speech data of the dataset by using an existing automatic speech recognition (Automatic Speech Recognition, ASR) system, to obtain a speech recognition result. A sample (second text) that is incorrectly recognized is filtered out. For example, the correct text (the first text) corresponding to the speech data is "The valet left the room.", and an ASR recognition result (the second text) is "The valley left the room.". Then, the first text and the second text may be formed as follows: ORI [SEP] ASR [EOS], and a GPT-2 small model is fine-tuned (fine-tune), to obtain the noise generation model. A plurality of candidate sentences are generated by using the obtained noise generation model, a pronunciation editing rate of the original sentence is calculated, and a candidate sentence with a rate less than or equal to 1.0 is reserved. The obtained sentence and a target language sentence corresponding to the original sentence form a new training sample. The target text (for example, "The priest tied the knot.") is input to the noise generation model obtained through training, to obtain the plurality of noisy texts ("The priest tied the knot.", "The priest down the knot.", "The priest to you, you.", "The priest tied the knight.", and "The priest tied the knot dot."). A text that is significantly different from the target text may be filtered out (for example, filtering out "The priest to you, you." and "The priest tied the knot dot."), to obtain a plurality of filtered noisy texts.

403: Train the text processing model by using at least the noisy text as training data, to obtain a trained text processing model.

In this embodiment of this application, the noisy text and a downstream task training sample (the correct text) may be used to train the text processing model. Optionally, a clean sample (the correct text) may be combined with the noisy text, to train the text processing model. Alternatively, the text processing model may first be trained, by using a clean sample (the correct text), to converge, and then the text processing model is fine-tuned based on a combination of a clean sample and an adversarial sample.

In this embodiment of this application, after the trained text processing model is obtained, to-be-recognized speech may be obtained. The to-be-recognized speech is processed based on a second speech recognition model, to obtain a recognition text. The recognition text is processed based on the trained text processing model, to obtain a processing result.

In this embodiment of this application, the trained text processing model may be used to perform at least one of the following tasks: text translation, text semantic recognition, text classification, automatic question answering, information recommendation, and text emotion recognition.

It should be understood that step 401, step 402, and step 403 may be performed by a terminal device or a server on a cloud side. Alternatively, step 401, step 402, and step 403 may be implemented through data processing and interaction between a terminal device and a server.

Optionally, the terminal device may obtain a target text, and send the target text to the server. The server processes the target text based on a noise generation model, to obtain a noisy text, where when the noise generation model is trained, training data of the noise generation model at least includes a first text and a second text, the first text is a correct text corresponding to speech data, and the second text is a text obtained by performing speech recognition on the speech data by using a first speech recognition model; and trains a text processing model by using at least the noisy text as training data, to obtain a trained text processing model.

Optionally, the terminal device may obtain a target text; process the target text based on a noise generation model, to obtain a noisy text, where when the noise generation model is trained, training data of the noise generation model at least includes a first text and a second text, the first text is a correct text corresponding to speech data, and the second text is a text obtained by performing speech recognition on the speech data by using a first speech recognition model; and send the noisy text to the server. The server may train a text processing model by using at least the noisy text as training data, to obtain a trained text processing model.

Optionally, the terminal device may obtain a target text; process the target text based on a noise generation model, to obtain a noisy text, where when the noise generation model is trained, training data of the noise generation model at least includes a first text and a second text, the first text is a correct text corresponding to speech data, and the second text is a text obtained by performing speech recognition on the speech data by using a first speech recognition model; and train a text processing model by using at least the noisy text as training data, to obtain a trained text processing model.

Optionally, the server may obtain a target text, and send the target text to the terminal device. The terminal device processes the target text based on a noise generation model, to obtain a noisy text, where when the noise generation model is trained, training data of the noise generation model at least includes a first text and a second text, the first text is a correct text corresponding to speech data, and the second text is a text obtained by performing speech recognition on the speech data by using a first speech recognition model; and sends the noisy text to the server. The server may train a text processing model by using at least the noisy text as training data, to obtain a trained text processing model.

Optionally, the server may obtain a target text, and send the target text to the terminal device. The terminal device processes the target text based on a noise generation model, to obtain a noisy text, where when the noise generation model is trained, training data of the noise generation model at least includes a first text and a second text, the first text is a correct text corresponding to speech data, and the second text is a text obtained by performing speech recognition on the speech data by using a first speech recognition model; and trains a text processing model by using at least the noisy text as training data, to obtain a trained text processing model.

Optionally, the server may obtain a target text; process the target text based on a noise generation model, to obtain a noisy text, where when the noise generation model is trained, training data of the noise generation model at least includes a first text and a second text, the first text is a correct text corresponding to speech data, and the second text is a text obtained by performing speech recognition on the speech data by using a first speech recognition model; and send the noisy text to the terminal device. The terminal device may train a text processing model by using at least the noisy text as training data, to obtain a trained text processing model.

Optionally, the server may obtain a target text; process the target text based on a noise generation model, to obtain a noisy text, where when the noise generation model is trained, training data of the noise generation model at least includes a first text and a second text, the first text is a correct text corresponding to speech data, and the second text is a text obtained by performing speech recognition on the speech data by using a first speech recognition model; and train a text processing model by using at least the noisy text as training data, to obtain a trained text processing model.

This embodiment is evaluated on two datasets, an STW conference dataset and an MSLT v1.1 public dataset, by using an example in which the text processing model is used for text translation. An evaluation index is a BLEU (Bilingual Evaluation Understudy) value.

Two text processing models of different scales are trained. The following table shows experimental results.

| Model | STW | | MSLT | |
|---|---|---|---|---|
| | dev | test | dev | test |
| baseline-small | 36.29 | 36.84 | 29.61 | 31.21 |
| robust-small | 36.93 (+0.64) | 37.69 (+0.85) | 30.69 (+1.08) | 32.56 (+1.35) |
| baseline-big | 44.18 | 44.03 | 33.75 | 34.29 |
| robust-big | 45.21 (+1.03) | 45.26 (+1.23) | 34.65 (+0.9) | 35.23 (+0.96) |

The experimental results are compared. It can be seen that this embodiment is significantly improved on a plurality of datasets.

This embodiment of this application provides a text data processing method. The method includes: obtaining the target text, processing the target text based on the noise generation model, to obtain the noisy text, where when the noise generation model is trained, the training data of the noise generation model at least includes the first text and the second text, the first text is the correct text corresponding to the speech data, and the second text is the text obtained by performing speech recognition on the speech data by using the first speech recognition model; and training the text processing model by using at least the noisy text as training data, to obtain the trained text processing model. The noise generation model in this embodiment of this application is obtained through training based on a recognition result of the first speech recognition model. In comparison with a noisy sample generation method according to a rule and word replacement, a noisy sample generated by the noise generation model can better reflect an actual error of the noise generation model.

Figure 5A:
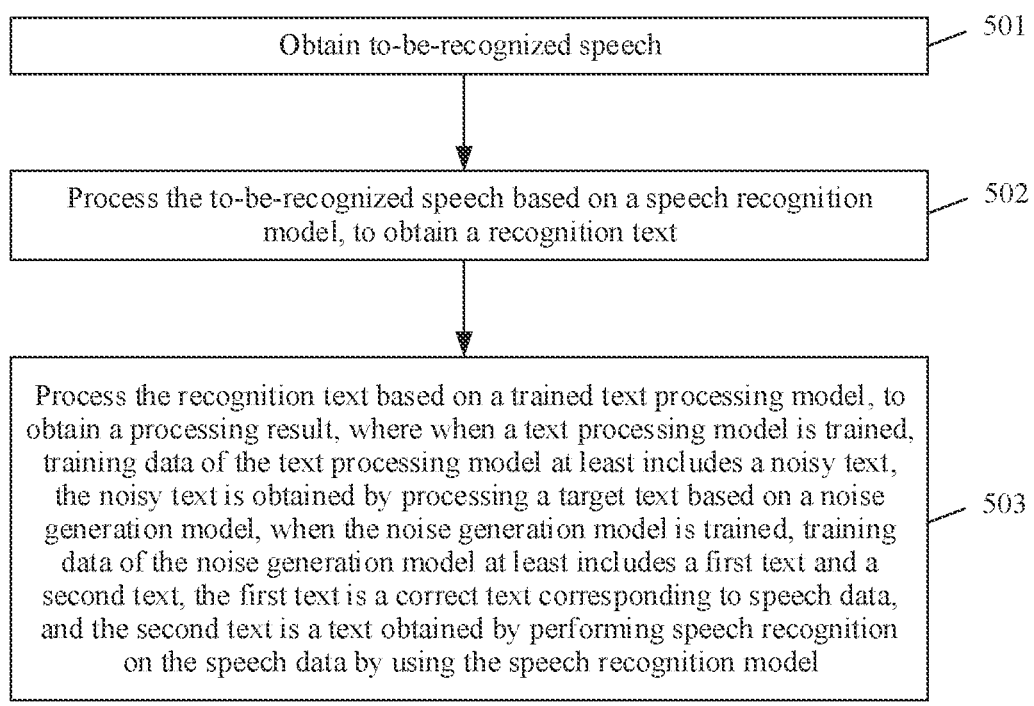
FIG. 5a is a schematic flowchart of a text data processing method according to an embodiment of this application.

FIG. 5a is a schematic flowchart of a text data processing method according to an embodiment of this application. As shown in FIG. 5a, the text processing method provided in this embodiment of this application includes the following steps.

501: Obtain to-be-recognized speech.

In this embodiment of this application, the to-be-recognized speech may be obtained. The to-be-recognized speech may be obtained by collecting speech of a user by an audio sensor, or may be speech data uploaded by a user.

502: Process the to-be-recognized speech based on a second speech recognition model, to obtain a recognition text.

Specifically, a recognition result may be obtained by processing the speech data based on the second speech recognition model. However, the recognition result obtained by the second speech recognition model may be inaccurate. For example, the speech recognition model processes a sentence: "where are you going?", to obtain a recognition result: "what are you going?".

503: Process the recognition text based on a trained text processing model, to obtain a processing result, where when a text processing model is trained, training data of the text processing model at least includes a noisy text, the noisy text is obtained by processing a target text based on a noise generation model, when the noise generation model is trained, training data of the noise generation model at least includes a first text and a second text, the first text is a correct text corresponding to speech data, and the second text is a text obtained by performing speech recognition on the speech data by using a first speech recognition model.

In this embodiment of this application, the trained text processing model may be used to perform at least one of the following tasks: text translation, text semantic recognition, text classification, automatic question answering, information recommendation, and text emotion recognition.

For the trained text processing model in step 503, refer to descriptions of step 403 in the embodiment corresponding to FIG. 4a. Details are not described herein again. In an optional implementation, when an input of the noise generation model includes the first text, an output of the noise generation model includes an output text, and a difference between the output text and the second text falls within a preset range.

In an optional implementation, a difference between the target text and the noisy text falls within the preset range.

In an optional implementation, a pronunciation difference between the target text and the noisy text falls within the preset range; and/or a difference between a character string included in the target text and a character string included in the noisy text falls within the preset range.

In an optional implementation, the first text is different from the second text.

In an implementation, an embodiment of this application further provides a text data processing method, including:

obtaining to-be-recognized speech; and processing the to-be-recognized speech based on a second speech recognition model, to obtain a recognition text. For details, refer to descriptions in step 501 and step 502. Details are not described herein again.

In this embodiment of this application, the recognition text may be processed based on a text error correction model, to obtain a denoised text, where when the text error correction model is trained, training data of the text error correction model at least includes a first text and a second text, the first text is a correct text corresponding to speech data, and the second text is a text obtained by performing speech recognition on the speech data by using a first speech recognition model. In an optional implementation, when an input of the text error correction model includes the second text, an output of the text error correction model includes an output text, and a difference between the output text and the first text falls within a preset range. The first text is different from the second text.

In this embodiment of this application, the denoised text may be processed based on the text processing model, to obtain a processing result.

Figure 5B:
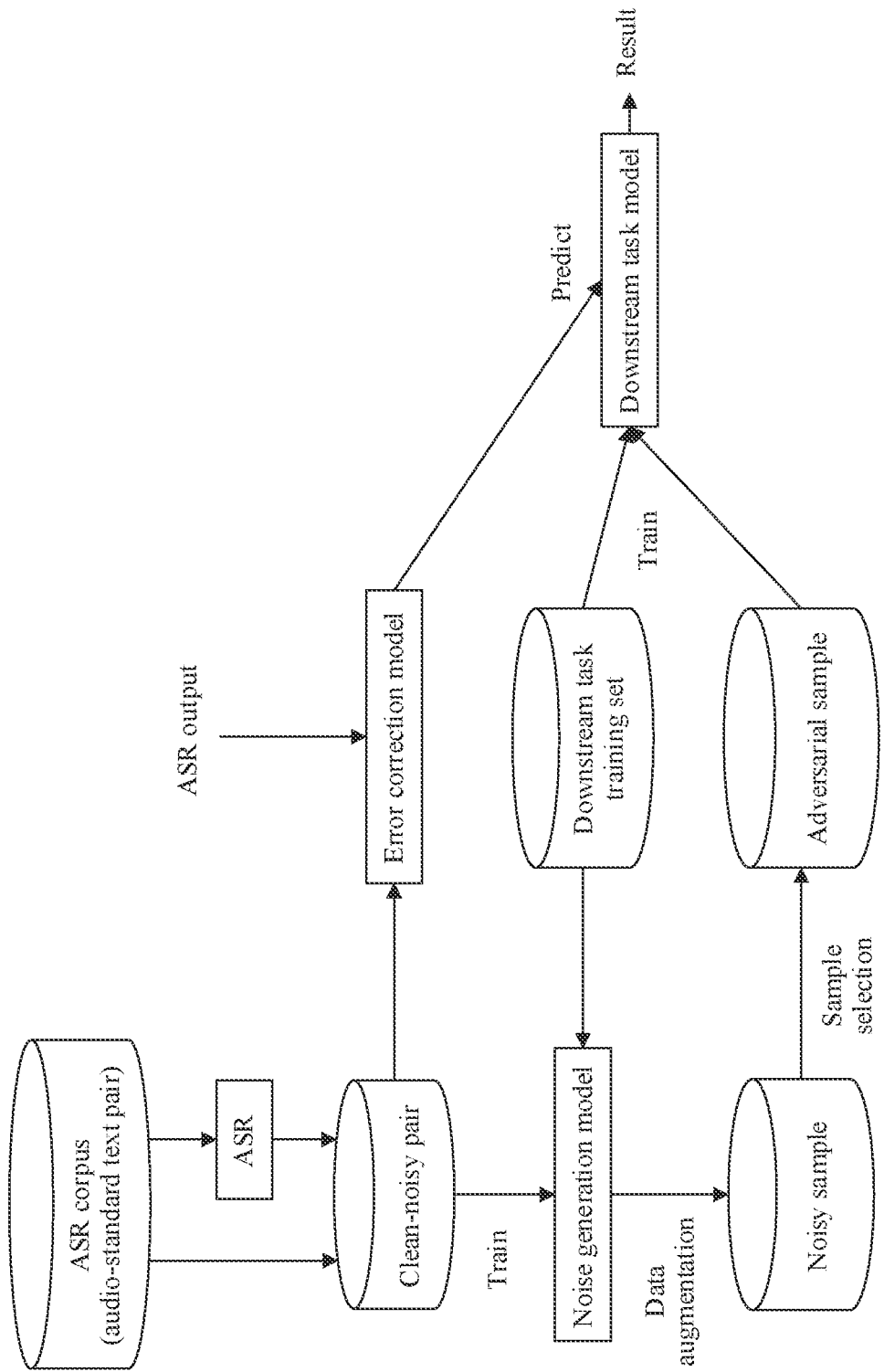
FIG. 5b is a schematic diagram of an architecture of a text data processing method according to an embodiment of this application.

FIG. 5b is a schematic diagram of an architecture of a text data processing method according to an embodiment of this application. As shown in FIG. 5b, speech data and a corresponding correct text (a first text) may be obtained from an ASR corpus, and the obtained speech data is processed based on ASR, to obtain a second text. The first text and the second text form a clean-noisy pair, a noise generation model is trained based on the clean-noisy pair, and a downstream task training set (namely, a training dataset used for training a text processing model) is obtained. Data augmentation (namely, adding noise) is performed on the training dataset based on the noise generation model, to obtain a noisy sample. Then, a sample whose difference between a noisy sample and a sample to which noise is not added is less than a preset value is selected from noisy samples, and the selected noisy sample used as an adversarial sample and the downstream task training set are used to train a downstream task model (namely, the text processing model), to obtain a trained text processing model.

As shown in FIG. 5b, an output (the second text) of ASR may be obtained, and error correction may be performed on the second text by using an error correction model, to obtain a denoised text. The denoised text is processed by using the downstream task model (namely, the text processing model), to obtain a processing result.

Figure 6:
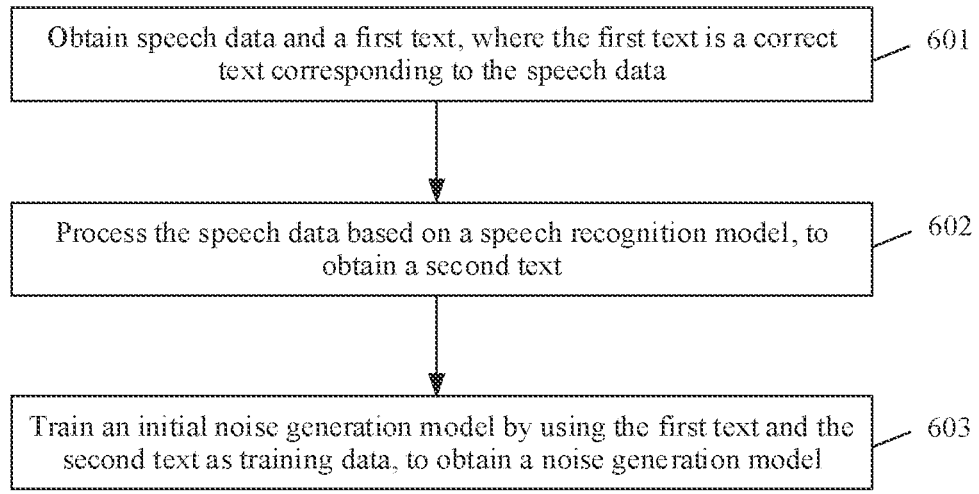
FIG. 6 is a schematic flowchart of a model training method based on a prediction model according to an embodiment of this application.

FIG. 6 is a schematic flowchart of a model training method according to an embodiment of this application. As shown in FIG. 6, the model training method provided in this embodiment of this application includes the following steps.

601: Obtain speech data and a first text, where the first text is a correct text corresponding to the speech data.

602: Process the speech data based on a first speech recognition model, to obtain a second text.

603: Train an initial noise generation model by using the first text and the second text as training data, to obtain a noise generation model.

Specifically, a recognition result may be obtained by processing the speech data based on the first speech recognition model. However, a recognition result obtained by a speech recognition model may be inaccurate. For example, the speech recognition model processes a sentence: "where are you going?", to obtain a recognition result: "what are you going?".

Therefore, when the recognition result is inaccurate, the recognition result is the second text different from the first text (the correct result). In this embodiment, the training device may form a sentence pair including the result (the second text) obtained by processing the speech data based on the first speech recognition model and a standard sentence (the first text), and train the noise generation model based on a standard-noise sentence pair.

Optionally, the noise generation model in this embodiment may be a text generation model or a text editing model. The text generation model may be a bidirectional long short-term memory (long short-term memory, LSTM), a GPT (generative pre-training) model, or the like. The text editing model may be a LaserTagger model of Google or the like.

An input of the text generation model is a sequence of segmentation words of the target text, and an output is a sequence of segmentation words of the noisy text. An input of the text editing model is the sequence of segmentation words of the target text, and an output is a modification manner of the input text. The input text may be modified as the noisy text based on the modification manner.

For a trained model, the correct text is input, to generate sentences with possible speech recognition errors. For example, a sentence "The priest tied the knot." is input, and the model may generate sentences such as "The priest told the knot." and "The priest tied the night." Pronunciation of the sentences is similar to that of the original sentence, and the sentences are possible errors of a speech recognition system.

In this embodiment, the target text may be processed based on the noise generation model, to obtain a plurality of noisy texts and a confidence of each noisy text, and one or more noisy texts are selected from the plurality of noisy texts based on the confidence. For example, a noisy text with a highest confidence or noisy texts with confidences that rank top may be selected.

Figure 7:
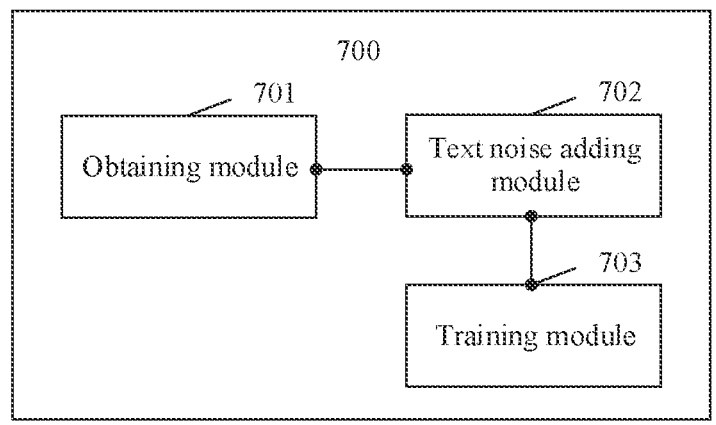
FIG. 7 is a schematic diagram of a text processing apparatus 700 according to an embodiment of this application.

The following describes a text processing apparatus provided in embodiments of this application from a perspective of an apparatus. FIG. 7 is a schematic diagram of a text processing apparatus 700 according to an embodiment of this application. As shown in FIG. 7, the text processing apparatus 700 provided in this embodiment of this application includes:

an obtaining module 701, configured to obtain a target text;

a text noise adding module 702, configured to process the target text based on a noise generation model, to obtain a noisy text, where when the noise generation model is trained, training data of the noise generation model at least includes a first text and a second text, the first text is a correct text corresponding to speech data, and the second text is a text obtained by performing speech recognition on the speech data by using a first speech recognition model; and a training module 703, configured to train a text processing model by using at least the noisy text as training data, to obtain a trained text processing model.

In an optional implementation, when an input of the noise generation model includes the first text, an output of the noise generation model includes an output text, and a difference between the output text and the second text falls within a preset range.

In an optional implementation, the trained text processing model is used to perform at least one of the following tasks: text translation, text semantic recognition, text classification, automatic question answering, information recommendation, and text emotion recognition.

In an optional implementation, a difference between the target text and the noisy text falls within the preset range.

In an optional implementation, the first text is different from the second text.

In an optional implementation, a pronunciation difference between the target text and the noisy text falls within the preset range; and/or
a difference between a character string included in the target text and a character string included in the noisy text falls within the preset range.

In an optional implementation, the text noise adding module is configured to: process the target text based on the noise generation model, to obtain a plurality of noisy texts and a confidence of each noisy text; and select one or more noisy texts from the plurality of noisy texts based on the confidence. The training module is configured to train the text processing model by using the one or more noisy texts as training data.

In an optional implementation, the obtaining module is configured to obtain to-be-recognized speech.

A speech recognition module is configured to process the to-be-recognized speech based on a second speech recognition model, to obtain a recognition text.

A text processing module is configured to process the recognition text based on the trained text processing model, to obtain a processing result.

In an optional implementation, the obtaining module is configured to obtain the speech data and the first text.

The speech recognition module is configured to: process the speech data based on the first speech recognition model, to obtain the second text; and process the first text based on an initial noise generation model, to obtain the output text.

The training module is configured to: obtain a loss based on the output text and the second text, and update the initial noise generation model based on the loss until the loss meets a preset condition, to obtain the noise generation model.

In an optional implementation, the noise generation model is at least one of the following: a bidirectional long short-term memory LSTM, a GPT (generative pre-training) model, and a LaserTagger model.

Figure 8:
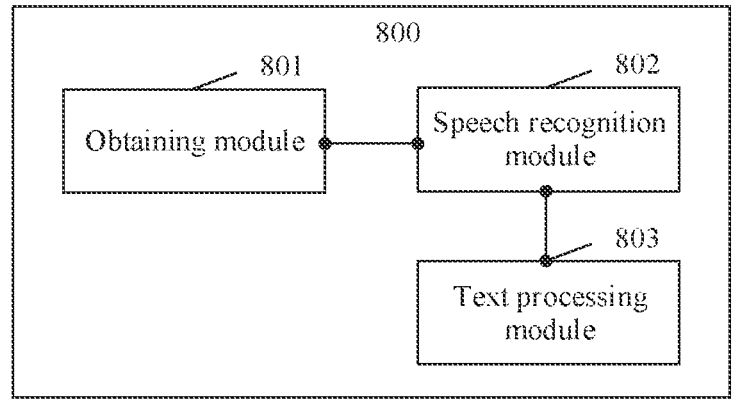
FIG. 8 is a schematic diagram of a text processing apparatus 800 according to an embodiment of this application.

FIG. 8 is a schematic diagram of a text processing apparatus 800 according to an embodiment of this application. As shown in FIG. 8, the text processing apparatus 800 provided in this embodiment of this application includes:
an obtaining module 801, configured to obtain to-be-recognized speech;
a speech recognition module 802, configured to process the to-be-recognized speech based on a second speech recognition model, to obtain a recognition text; and
a text processing module 803, configured to process the recognition text based on a trained text processing model, to obtain a processing result, where when a text processing model is trained, training data of the text processing model at least includes a noisy text, the noisy text is obtained by processing a target text based on a noise generation model, when the noise generation model is trained, training data of the noise generation model at least includes a first text and a second text, the first text is a correct text corresponding to speech data, and the second text is a text obtained by performing speech recognition on the speech data by using a first speech recognition model.

In an optional implementation, when an input of the noise generation model includes the first text, an output of the noise generation model includes an output text, and a difference between the output text and the second text falls within a preset range.

In an optional implementation, the trained text processing model is used to perform at least one of the following tasks: text translation, text semantic recognition, text classification, automatic question answering, information recommendation, and text emotion recognition.

In an optional implementation, a difference between the target text and the noisy text falls within the preset range.

In an optional implementation, the first text is different from the second text.

In an optional implementation, a pronunciation difference between the target text and the noisy text falls within the preset range; and/or
a difference between a character string included in the target text and a character string included in the noisy text falls within the preset range.

Figure 9:
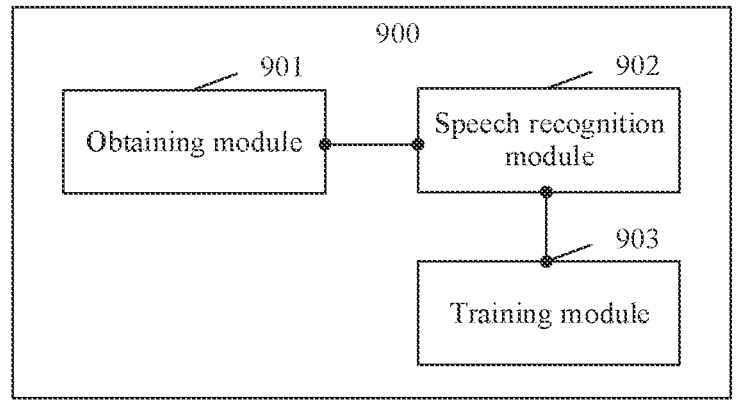
FIG. 9 is a schematic diagram of a model training apparatus 900 according to an embodiment of this application.

FIG. 9 is a schematic diagram of a model training apparatus 900 according to an embodiment of this application. As shown in FIG. 9, the model training apparatus 900 provided in this embodiment of this application includes:
an obtaining module 901, configured to obtain speech data and a first text, where the first text is a correct text corresponding to the speech data;
a speech recognition module 902, configured to process the speech data based on a first speech recognition model, to obtain a second text; and
a training module 903, configured to train an initial noise generation model by using the first text and the second text as training data, to obtain a noise generation model.

In an optional implementation, the training module 903 is configured to: process the first text based on the initial noise generation model, to obtain an output text; and
obtain a loss based on the output text and the second text, and update the initial noise generation model based on the loss until the loss meets a preset condition, to obtain the noise generation model.

In an optional implementation, the noise generation model and the initial noise generation model each are at least one of the following: a bidirectional long short-term memory LSTM, a GPT (generative pre-training) model, and a LaserTagger model.

Figure 10:
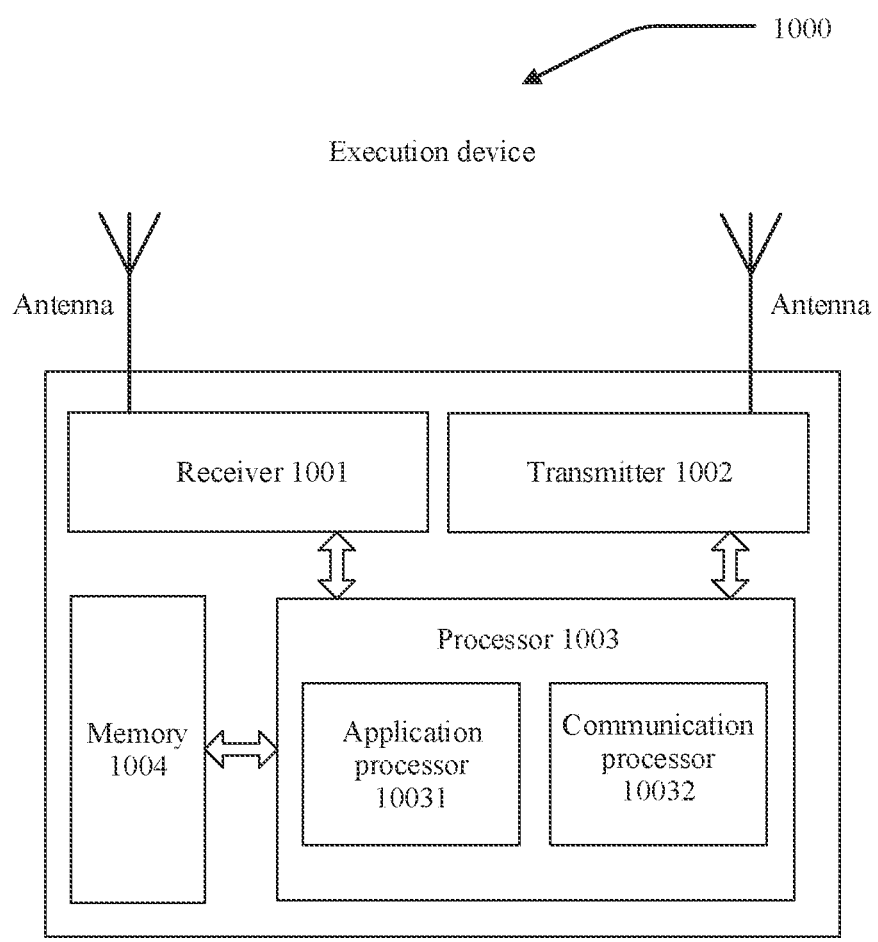
FIG. 10 is a schematic diagram of a structure of an execution device according to an embodiment of this application.

The following describes an execution device provided in an embodiment of this application. FIG. 10 is a schematic diagram of a structure of an execution device according to an embodiment of this application. An execution device 1000 may specifically be represented as a mobile phone, a tablet, a notebook computer, an intelligent wearable device, a server, or the like. This is not limited herein. The data processing apparatus described in the embodiment corresponding to FIG. 10 may be deployed on the execution device 1000, and is configured to implement a data processing function in the embodiment corresponding to FIG. 10. Specifically, the execution device 1000 includes: a receiver 1001, a transmitter 1002, a processor 1003, and a memory 1004 (there may be one or more processors 1003 in the execution device 1000, and one processor is used as an example in FIG. 10). The processor 1003 may include an application processor 10031 and a communication processor 10032. In some embodiments of this application, the receiver 1001, the transmitter 1002, the processor 1003, and the memory 1004 may be connected by using a bus or in another manner.

The memory 1004 may include a read-only memory and a random access memory, and provide instructions and data for the processor 1003. A part of the memory 1004 may further include a nonvolatile random access memory (nonvolatile random access memory, NVRAM). The memory 1004 stores a processor and operation instructions, an executable module or a data structure, a subnet thereof, or an extended set thereof. The operation instructions may include various operation instructions to implement various operations.

The processor 1003 controls an operation of the execution device. During specific application, the components of the execution device are coupled together through a bus system. In addition to a data bus, the bus system may further include a power bus, a control bus, a status signal bus, and the like. However, for clear description, various types of buses in the figure are marked as the bus system.

The method disclosed in embodiments of this application may be applied to the processor 1003, or may be implemented by the processor 1003. The processor 1003 may be an integrated circuit chip, and have a signal processing capability. In an implementation process, steps in the methods can be implemented by using a hardware integrated logical circuit in the processor 1003, or by using instructions in a form of software. The processor 1003 may be a general-purpose processor, a digital signal processor (digital signal processor, DSP), a microprocessor, or a microcontroller. The processor 1003 may further include an application-specific integrated circuit (application-specific integrated circuit, ASIC), a field programmable gate array (field programmable gate array, FPGA) or another programmable logic device, a discrete gate, or a transistor logic device, or a discrete hardware component. The processor 1003 may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1004, and the processor 1003 reads information in the memory 1004 and completes the steps in the foregoing methods in combination with hardware of the processor 1003.

The receiver 1001 may be configured to receive input digital or character information, and generate a signal input related to setting and function control of the execution device. The transmitter 1002 may be configured to output digital or character information by using a first interface. The transmitter 1002 may further be configured to send instructions to a disk group by using the first interface, to modify data in the disk group. The transmitter 1002 may further include a display device such as a display screen.

In this embodiment of this application, in one case, the processor 1003 is configured to perform the text data processing method performed by the execution device in the embodiment corresponding to FIG. 5*a*.

Figure 11:
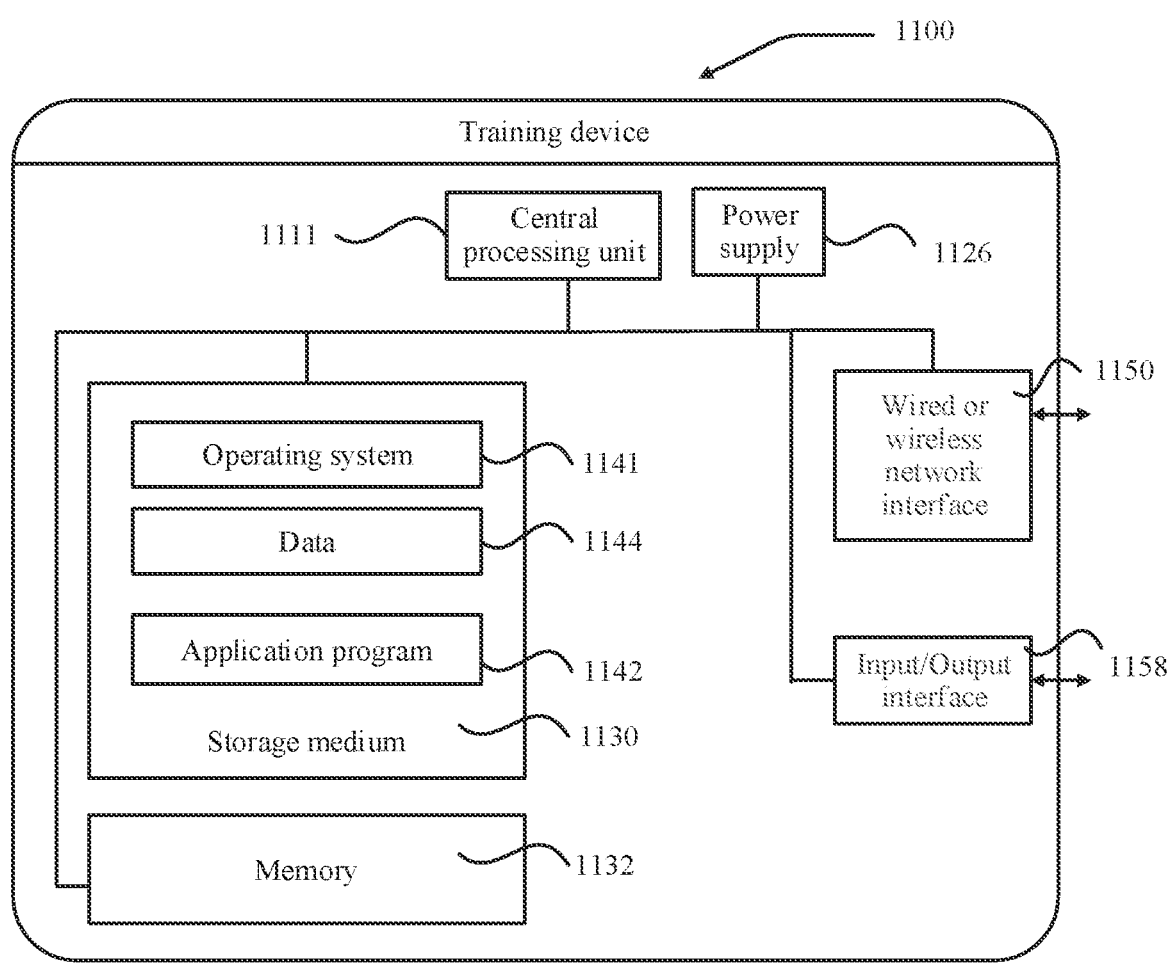
FIG. 11 is a schematic diagram of a structure of a training device according to an embodiment of this application.

An embodiment of this application further provides a training device. FIG. 11 is a schematic diagram of a structure of a training device according to an embodiment of this application. Specifically, a training device 1100 is implemented by one or more servers. The training device 1100 may vary greatly with configuration or performance, and may include one or more central processing units (central processing unit, CPU) 1111 (for example, one or more processors), a memory 1132, and one or more storage media 1130 (for example, one or more mass storage devices) that store an application program 1142 or data 1144. The memory 1132 and the storage medium 1130 may perform transitory storage or persistent storage. The program stored in the storage medium 1130 may include one or more modules (not shown in the figure), and each module may include a series of instruction operations for the training device. Further, the central processing unit 1111 may be configured to communicate with the storage medium 1130, and perform the series of instruction operations in the storage medium 1130 on the training device 1100.

The training device 1100 may further include one or more power supplies 1126, one or more wired or wireless network interfaces 1150, one or more input/output interfaces 1158, or one or more operating systems 1141, for example, Windows Server™, Mac OS X™, Unix™ Linux™, and FreeBSD™.

Specifically, the training device may perform steps in the embodiments corresponding to FIG. 4*a* and FIG. 6.

An embodiment of this application further provides a computer program product. When the computer program product runs on a computer, the computer is enabled to perform steps performed by the execution device or steps performed by the training device.

An embodiment of this application further provides a computer-readable storage medium. The computer-readable storage medium stores a program used for signal processing. When the program is run on a computer, the computer is enabled to perform steps performed by the execution device or steps performed by the training device.

The execution device, the training device, or the terminal device in embodiments of this application may specifically be a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the execution device performs the data processing method described in the embodiments, or a chip in the training device performs the data processing method described in the embodiments. Optionally, the storage unit is a storage unit in the chip, for example, a register or a buffer. Alternatively, the storage unit may be a storage unit in a wireless access device but outside the chip, for example, a read-only memory (read-only memory, ROM), another type of static storage device that can store static information and instructions, or a random access memory (random access memory, RAM).

Figure 12:
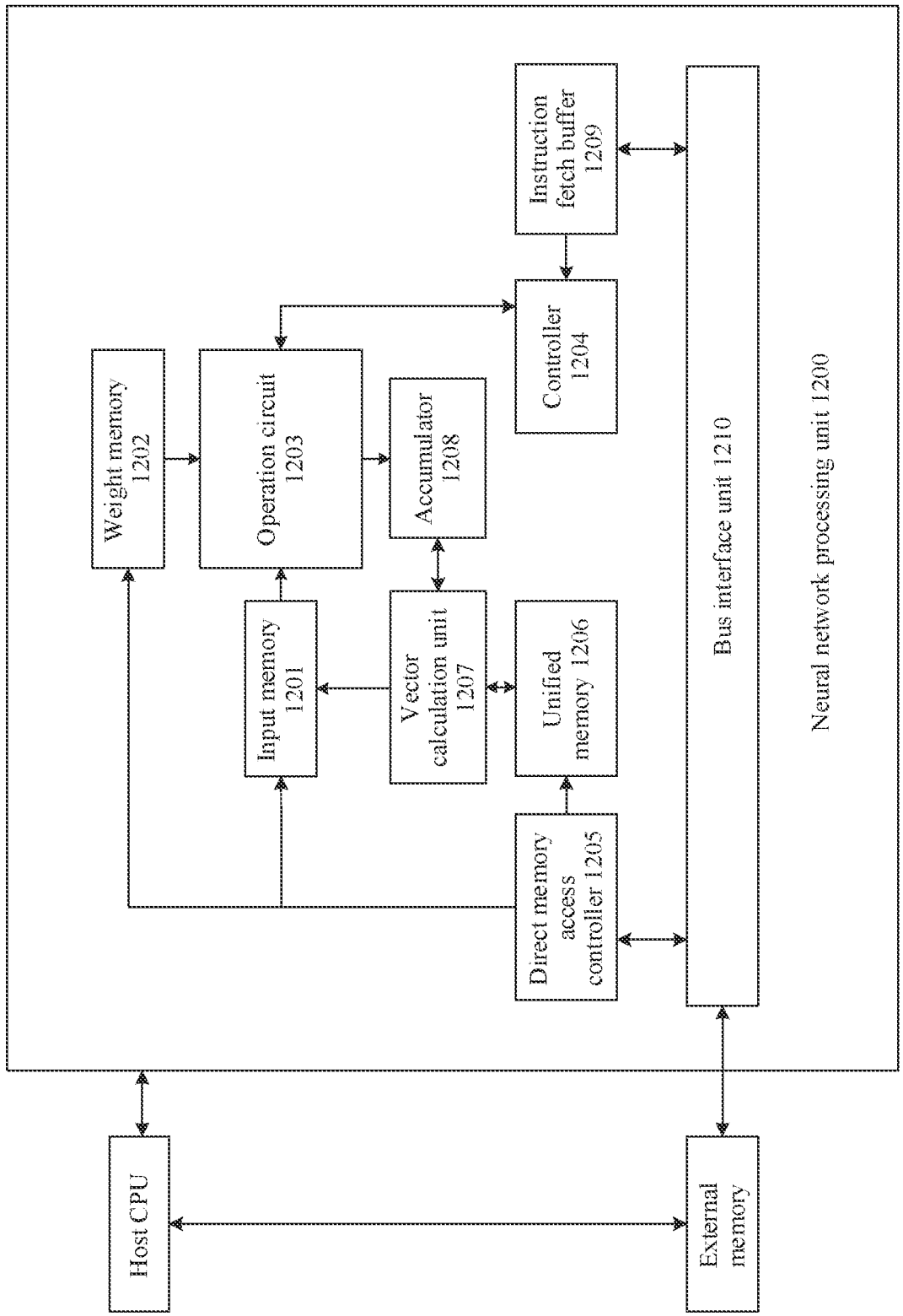
FIG. 12 is a schematic diagram of a structure of a chip according to an embodiment of this application.

Specifically, FIG. 12 is a schematic diagram of a structure of a chip according to an embodiment of this application. The chip may be represented as a neural network processing unit NPU 1200. The NPU 1200 is mounted to a host CPU (Host CPU) as a coprocessor, and the host CPU allocates a task. A core part of the NPU is an operation circuit 1203, and a controller 1204 controls the operation circuit 1203 to extract matrix data in a memory and perform a multiplication operation.

In some implementations, the operation circuit 1203 includes a plurality of processing engines (process engine, PE) inside. In some implementations, the operation circuit 1203 is a two-dimensional systolic array. The operation circuit 1203 may alternatively be a one-dimensional systolic array or another electronic circuit capable of performing mathematical operations such as multiplication and addition. In some implementations, the operation circuit 1203 is a general-purpose matrix processor.

For example, it is assumed that there are an input matrix A, a weight matrix B, and an output matrix C. The operation circuit fetches, from a weight memory 1202, data corresponding to the matrix B, and caches the data on each PE in the operation circuit. The operation circuit fetches data of the matrix A from an input memory 1201, to perform a matrix operation on the matrix B, and stores an obtained partial result or an obtained final result of the matrix in an accumulator (accumulator) 1208.

A unified memory 1206 is configured to store input data and output data. The weight data is directly transferred to the weight memory 1202 by using a direct memory access controller (direct memory access controller, DMAC) 1205. The input data is also transferred to the unified memory 1206 by using the DMAC.

A BIU is a bus interface unit, namely, a bus interface unit 1210, and is configured to perform interaction between an AXI bus, and the DMAC and an instruction fetch buffer (Instruction Fetch Buffer, IFB) 1209.

The bus interface unit (bus interface unit, BIU) 1210 is used by the instruction fetch buffer 1209 to obtain instructions from an external memory, and is further used by the direct memory access controller 1205 to obtain original data of the input matrix A or the weight matrix B from the external memory.

The DMAC is mainly configured to transfer input data in the external memory DDR to the unified memory 1206, or transfer the weight data to the weight memory 1202, or transfer the input data to the input memory 1201.

A vector calculation unit 1207 includes a plurality of operation processing units. If required, further processing is performed on an output of the operation circuit 1203, for example, vector multiplication, vector addition, an exponential operation, a logarithmic operation, or size comparison. The vector calculation unit 1207 is mainly configured to perform network calculation at a non-convolutional/fully connected layer in a neural network, for example, batch normalization (batch normalization), pixel-level summation, and upsampling on a feature plane.

In some implementations, the vector calculation unit 1207 can store a processed output vector in a unified memory 1206. For example, the vector calculation unit 1207 may apply a linear function or a non-linear function to the output of the operation circuit 1203, for example, perform linear interpolation on a feature plane extracted at a convolutional layer. For another example, the linear function or the non-linear function is applied to a vector of an accumulated value to generate an activation value. In some implementations, the vector calculation unit 1207 generates a normalized value, a pixel-level summation value, or both. In some implementations, the processed output vector can be used as an activated input to the operation circuit 1203, for example, the processed output vector can be used at a subsequent layer of the neural network.

The instruction fetch buffer (instruction fetch buffer) 1209 connected to the controller 1204 is configured to store instructions used by the controller 1204.

The unified memory 1206, the input memory 1201, the weight memory 1202, and the instruction fetch buffer 1209 are all on-chip memories. The external memory is private for the NPU hardware architecture.

The processor mentioned above may be a general-purpose central processing unit, a microprocessor, an ASIC, or one or more integrated circuits for controlling program execution.

In addition, it should be noted that the apparatus embodiments described above are merely an example. The units described as separate parts may or may not be physically separate, and parts displayed as units may or may not be physical units, may be located in one position, or may be distributed on a plurality of network units. Some or all the modules may be selected based on an actual requirement to achieve objectives of the solutions of the embodiments. In addition, in the accompanying drawings of the apparatus embodiments provided in this application, connection relationships between modules indicate that the modules have communication connections with each other, which may specifically be implemented as one or more communication buses or signal cables.

Based on the descriptions of the foregoing implementations, a person skilled in the art may clearly understand that this application may be implemented by software in addition to necessary universal hardware, or certainly may be implemented by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, for this application, software program implementation is a better implementation in more cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods in embodiments of this application.

All or some of the embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid-State Disk, SSD)), or the like.

What is claimed is:
1. A text data processing method, comprising:
 obtaining speech data and a first text, wherein the first text is a correct text corresponding to the speech data;

performing automatic speech recognition (ASR) on the speech data based on a first speech recognition model to obtain a second text;
processing the first text based on an initial noise generation model to obtain an output text;
obtaining a loss based on the output text and the second text;
updating the initial noise generation model based on the loss until the loss meets a preset condition to obtain a noise generation model, wherein the noise generation model is at least one of the following: a bidirectional long short-term memory (LSTM), a generative pre-training (GPT) model, or a Laser Tagger model;
obtaining a target text;
processing the target text based on the noise generation model to obtain a noisy text; and
training a text processing model, by using at least the noisy text as training data, to obtain a trained text processing model, wherein the trained text processing model is used to perform at least one of the following tasks: text translation, text semantic recognition, text classification, automatic question answering, information recommendation, or text emotion recognition.

2. The method according to claim 1, wherein when an input of the noise generation model comprises the first text, an output of the noise generation model comprises the output text, and a difference between the output text and the second text falls within a preset range.

3. The method according to claim 1, wherein a difference between the target text and the noisy text falls within a preset range.

4. The method according to claim 1, wherein at least one of the following occurs:
a pronunciation difference between the target text and the noisy text falls within a preset range; or
a difference between a character string comprised in the target text and a character string comprised in the noisy text falls within a preset range.

5. The method according to claim 1, wherein the first text is different from the second text.

6. The method according to claim 1, wherein the processing the target text based on a noise generation model comprises:
processing the target text based on the noise generation model to obtain a plurality of noisy texts and a confidence of each noisy text; and
selecting one or more noisy texts from the plurality of noisy texts based on the confidence of each noisy text, wherein the training a text processing model by using at least the noisy text as training data comprises training the text processing model by using the one or more noisy texts as training data.

7. The method according to claim 1, wherein the method further comprises:
obtaining to-be-recognized speech;
processing the to-be-recognized speech based on a second speech recognition model to obtain a recognition text; and
processing the recognition text based on the trained text processing model to obtain a processing result.

8. A model training method, wherein the method comprises:
obtaining speech data and a first text, wherein the first text is a correct text corresponding to the speech data;
performing automatic speech recognition (ASR) on the speech data based on a first speech recognition model to a obtain a second text; and training an initial noise generation model, by using the first text and the second text as training data, to obtain a noise generation model, wherein the training an initial noise generation model by using the first text and the second text as training data comprises: processing the first text based on the initial noise generation model to obtain an output text; obtaining a loss based on the output text and the second text; and updating the initial noise generation model based on the loss until the loss meets a preset condition, to obtain the noise generation model, wherein the noise generation model and the initial noise generation model each are at least one of the following: a bidirectional long short-term memory (LSTM), a generative pre-training (GPT) model, or a LaserTagger model.

9. A text data processing method, comprising:
obtaining speech data and a first text, wherein the first text is a correct text corresponding to the speech data;
performing automatic speech recognition (ASR) on the speech data based on a first speech recognition model to obtain a second text;
processing the first text based on an initial noise generation model to obtain an output text;
obtaining a loss based on the output text and the second text;
updating the initial noise generation model based on the loss until the loss meets a preset condition to obtain a noise generation model, wherein the noise generation model is at least one of the following: a bidirectional long short-term memory (LSTM), a generative pre-training (GPT) model, or a LaserTagger model;
obtaining a target text;
processing the target text based on the noise generation model to obtain a noisy text;
training a text processing model, by using at least the noisy text as training data, to obtain a trained text processing model, wherein the trained text processing model is used to perform at least one of the following tasks: text translation, text semantic recognition, text classification, automatic question answering, information recommendation, or text emotion recognition;
obtaining to-be-recognized speech;
processing the to-be-recognized speech based on a second speech recognition model to obtain a recognition text; and
processing the recognition text based on Hall the trained text processing model to obtain a processing result.

10. The method according to claim 9, wherein when an input of the noise generation model comprises the first text, an output of the noise generation model comprises the output text, and a difference between the output text and the second text falls within a preset range.

11. The method according to claim 9, wherein a difference between the target text and the noisy text falls within a preset range.

12. The method according to claim 9, wherein at least one of the following occurs:
a pronunciation difference between the target text and the noisy text falls within a preset range; or
a difference between a character string comprised in the target text and a character string comprised in the noisy text falls within a preset range.

13. The method according to claim 9, wherein the first text is different from the second text.

14. A non-transitory computer storage medium, wherein the computer storage medium stores one or more instructions, and when the instructions are executed by one or more computers, the one or more computers are enabled to perform operations comprising:
- obtaining speech data and a first text, wherein the first text is a correct text corresponding to the speech data;
- performing automatic speech recognition (ASR) on the speech data based on a first speech recognition model to obtain a second text;
- processing the first text based on an initial noise generation model to obtain an output text;
- obtaining a loss based on the output text and the second text;
- updating the initial noise generation model based on the loss until the loss meets a preset condition to obtain a noise generation model, wherein the noise generation model is at least one of the following: a bidirectional long short-term memory (LSTM), a generative pre-training (GPT) model, or a LaserTagger model;
- obtaining a target text;
- processing the target text based on the noise generation model to obtain a noisy text; and
- training a text processing model by using at least the noisy text as training data, to obtain a trained text processing model, wherein the trained text processing model is used to perform at least one of the following tasks: text translation, text semantic recognition, text classification, automatic question answering, information recommendation, or text emotion recognition.

15. The non-transitory computer storage medium according to claim 14, wherein when an input of the noise generation model comprises the first text, an output of the noise generation model comprises the output text, and a difference between the output text and the second text falls within a preset range.

16. The non-transitory computer storage medium according to claim 14, wherein a difference between the target text and the noisy text falls within a preset range.

17. The non-transitory computer storage medium according to claim 14, wherein at least one of the following occurs:
- a pronunciation difference between the target text and the noisy text falls within a preset range; or
- a difference between a character string comprised in the target text and a character string comprised in the noisy text falls within a preset range.

18. The non-transitory computer storage medium according to claim 14, wherein the first text is different from the second text.

19. The non-transitory computer storage medium according to claim 14, wherein the processing the target text based on a noise generation model comprises:
- processing the target text based on the noise generation model to obtain a plurality of noisy texts and a confidence of each noisy text; and
- selecting one or more noisy texts from the plurality of noisy texts based on the confidence of each noisy text, wherein the training a text processing model by using at least the noisy text as training data comprises training the text processing model by using the one or more noisy texts as training data.

20. The non-transitory computer storage medium according to claim 14, wherein the operations further comprise:
- obtaining to-be-recognized speech;
- processing the to-be-recognized speech based on a second speech recognition model to obtain a recognition text; and
- processing the recognition text based on the trained text processing model to obtain a processing result.

* * * * *